United States Patent
Hoadley et al.

(10) Patent No.: US 11,949,354 B2
(45) Date of Patent: Apr. 2, 2024

(54) SYSTEMS AND METHODS FOR CONTROLLING A SWITCHING DEVICE FOR AN ELECTRIC MOTOR WITH SELECTIVE FLUX STATOR

(71) Applicant: ABB Schweiz AG, Baden (CH)

(72) Inventors: Frederick L. Hoadley, Mequon, WI (US); Hoat V. Phung, Oak Creek, WI (US); Timothy S. Collins, Fountain Inn, SC (US); Robert F. McElveen, Jr., Anderson, SC (US)

(73) Assignee: ABB Schweiz AG, Baden (CH)

( * ) Notice: Subject to any disclaimer, the term of this patent is extended or adjusted under 35 U.S.C. 154(b) by 32 days.

(21) Appl. No.: 17/665,908

(22) Filed: Feb. 7, 2022

(65) Prior Publication Data
US 2023/0253901 A1 Aug. 10, 2023

(51) Int. Cl.
*H02P 21/12* (2016.01)
*H02P 21/22* (2016.01)
*H02P 21/34* (2016.01)

(52) U.S. Cl.
CPC ............. *H02P 21/12* (2013.01); *H02P 21/22* (2016.02); *H02P 21/34* (2016.02); *H02P 2207/05* (2013.01)

(58) Field of Classification Search
CPC .......... H02P 21/12; H02P 21/22; H02P 21/34; H02P 2207/05
USPC ....................................................... 318/400.2
See application file for complete search history.

(56) References Cited

U.S. PATENT DOCUMENTS

| | | |
|---|---|---|
| 5,142,213 A | 8/1992 | Stelter |
| 6,768,411 B2 | 7/2004 | Luttrell |
| 2013/0127391 A1* | 5/2013 | Lewis ..................... H02P 25/18 318/498 |
| 2013/0221791 A1* | 8/2013 | Tomohara ............... H02P 25/18 310/198 |

(Continued)

OTHER PUBLICATIONS

Aliabad et al., "Line-Start Permanent-Magnet Motors: Significant Improvements in Starting Torque, Synchronization, and Steady-State Performance," *IEEE Transactions on Magnetics*, 46(12): 4066-4072 (Dec. 2010).

(Continued)

*Primary Examiner* — Jorge L Carrasquillo
(74) *Attorney, Agent, or Firm* — Leydig, Voit & Mayer, Ltd.

(57) ABSTRACT

A system comprising a synchronous three-phase electric motor and a controller is provided. The synchronous three-phase electric motor comprises a rotor, a stator, a plurality of coils, and a plurality of switching devices. The plurality of coils formed from conductive windings each wound around one or more of a plurality of stator teeth of the stator. The plurality of coils comprises a plurality of permanent coils and a plurality of bypass coils. The plurality of switching devices configured to selectively switch between a tapped position and a primary position. The controller is configured to provide a first switching command to the plurality of switching devices to switch from the primary position to the tapped position based on a transition signal. The transition signal is based on comparing an electrical characteristic associated with one or more input currents to the plurality of switching devices with a threshold value.

19 Claims, 20 Drawing Sheets

(56) References Cited

U.S. PATENT DOCUMENTS

2014/0210297 A1   7/2014  Shizu
2020/0072244 A1   3/2020  Baumann et al.

OTHER PUBLICATIONS

Ferreira et al., "Comparison of Different Tapped Windings for Flux Adjustment in induction Motors," *IEEE Transactions on Energy Conversion*, 29(2): 375-391 (Jun. 2014).
Miller, "Synchronization of Line-Start Permanent-Magnet AC Motors." *IEEE Transactions on Power Apparatus and Systems*, PAS-103(7): 1822-1828 (Jul. 1984).
Rabbi et al., "Analysis of Starting and Synchronization Process for Line Start IPM Motors," *2012 7th International Conference on Electrical and Computer Engineering*, IEEE, 311-314 (Dec. 20-22, 2012).
Rabbi et al., "Critical Criteria for Successful Synchronization of Line-Start IPM Motors," *IEEE Journal of Emerging and Selected Topics in Power Electronics*, 2(2): 348-358 (Jun. 2014).
Zili et al., "Research on a Novel Wye-delta Soft Start Method of Three-Phase Induction Motor," *Proceedings of The 7th International Power Electronics and Motion Control Conference*, IEEE, 5 pp. (Jun. 2-5, 2012).

\* cited by examiner

Receive a start command for starting a synchronous electric motor, wherein the synchronous electric motor comprises one or more switching devices that selectively switches between a tapped position and a primary position, wherein the tapped position electrically communicates power to only a plurality of permanent coils, and wherein the primary position electrically communicates power to the plurality of permanent coils and a plurality of bypass coils ⎯ 1202

Provide a first switching command to the one or more switching devices to switch to the tapped position based on obtaining a transition signal from a control circuitry, wherein the control circuitry comprises a comparator that compares an electrical characteristic associated with one or more input currents to the one or more switching devices with a threshold value ⎯ 1204

Subsequent to providing the first switching command, provide a second switching command to the one or more switching devices to switch to the primary position from the tapped position ⎯ 1206

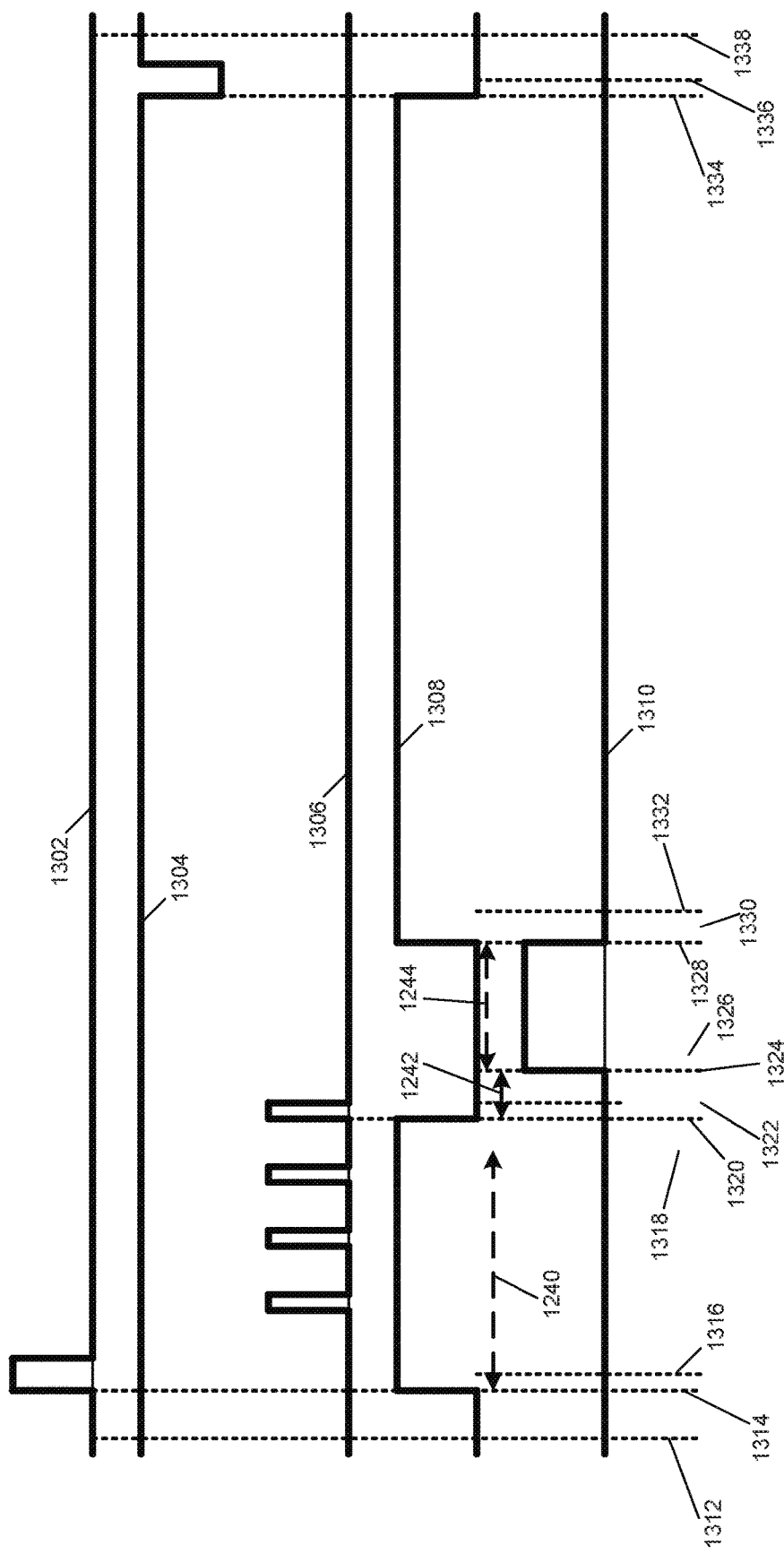

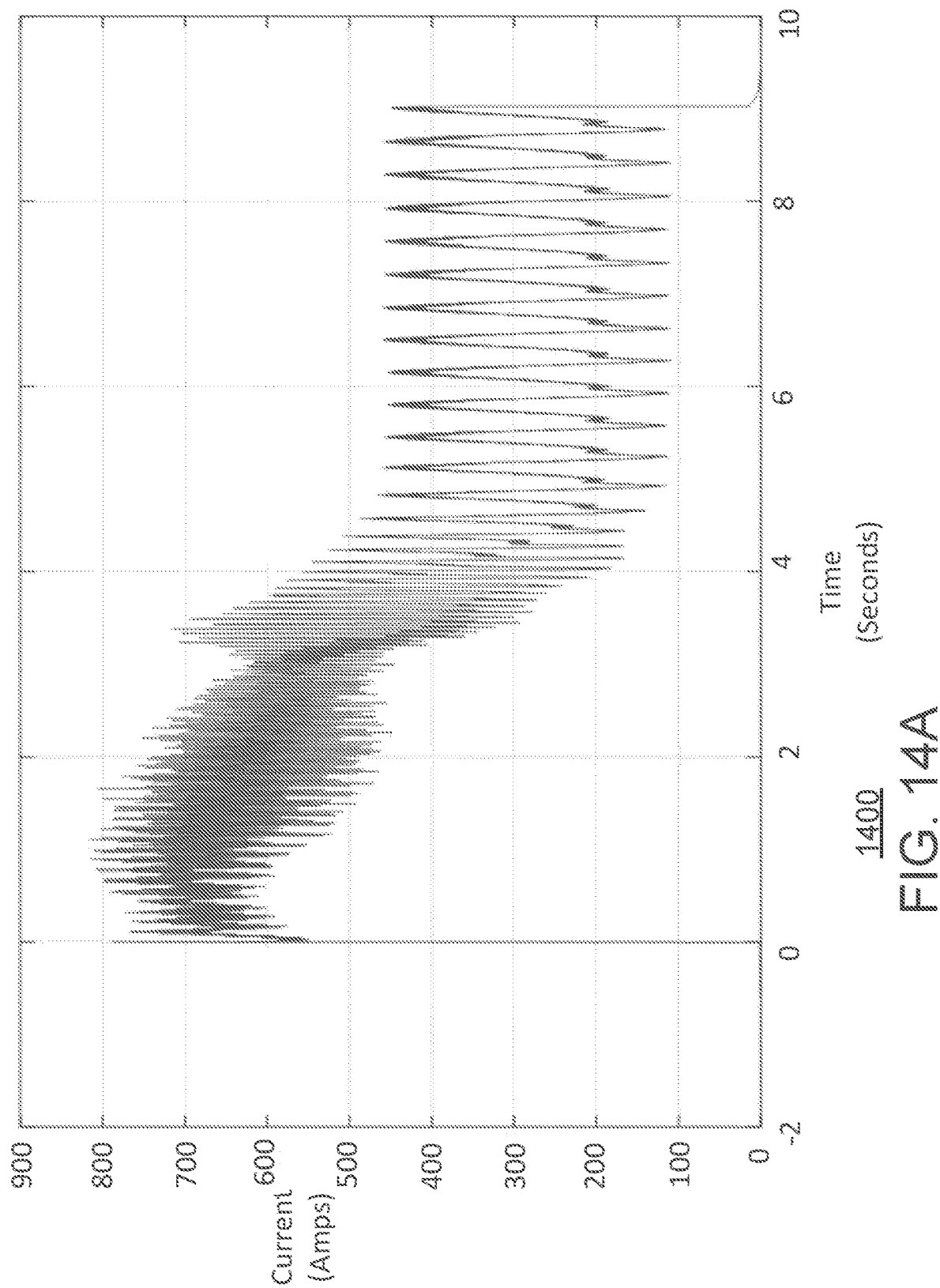

1500

SYSTEMS AND METHODS FOR CONTROLLING A SWITCHING DEVICE FOR AN ELECTRIC MOTOR WITH SELECTIVE FLUX STATOR

FIELD

The present disclosure relates to synchronous electric motors and, more particularly, to systems and methods for controlling a switching device for an electric motor with a selective flux stator.

BACKGROUND

Electric motors are devices that convert electricity into a motive mechanical force output as torque associated with a rotating motor shaft. Electric motors operate on various operating principles and can utilize different types of electrical power. One example is an alternating current synchronous electric motor that receives alternating current from a suitable power source. The alternating current is conductively directed through a plurality of conductive windings or coils disposed circumferentially about the stator of the electric motor. Conduction of the alternating current in the windings generate a magnetic field or flux that can electromagnetically interact with the rotor rotatably disposed in and concentrically surrounded by the stator. The periodic or wavelike nature of the alternating current causes the magnetic field produced by the stator windings to concentrically rotate about the stator which the rotor will tend to follow.

A characteristic of synchronous electric motors is that the rotational speed of the rotor locks in synchronization with the frequency of the alternating current conducted through the stator windings. Synchronization causes the rotor to rotate at the same speed as the revolving magnetic field. The speed that the magnetic field rotates around the stator and the locked rotational speed of the rotor is referred to as synchronous speed. One disadvantage of synchronous motors, such as line start permanent magnet motors or cage rotor permanent magnet motors, is that at startup they must be promptly brought to and maintained at synchronous speed and therefore may include additional starting devices or circuit configurations. Synchronous electric motors of the foregoing types may therefore be unsuitable for high inertial load conditions such as rotating industrial fans, blowers or pumps that require large amounts of synchronizing energy at startup. The present disclosure is directed to a stator winding configuration for an alternating current synchronous electric motor particularly suited to start under high inertial load conditions.

BRIEF SUMMARY

A first aspect of the present disclosure provides a system comprising: a synchronous three-phase electric motor, comprising: a rotor; a stator concentrically disposed about the rotor; a plurality of coils formed from conductive windings each wound around one or more of a plurality of stator teeth of the stator, wherein the plurality of coils comprises a plurality of permanent coils and a plurality of bypass coils; and a plurality of switching devices configured to selectively switch between a tapped position and a primary position, wherein the primary position electrically communicates power to only the plurality of permanent coils, and wherein the tapped position communicates power to both the plurality of permanent coils and the plurality of bypass coils; and a controller configured to: provide a first switching command to the plurality of switching devices to switch from the primary position to the tapped position based on a transition signal, wherein the transition signal is based on comparing an electrical characteristic associated with one or more input currents to the plurality of switching devices with a threshold value.

According to an implementation of the first aspect, the plurality of permanent coils comprise a first set of permanent coils for a first phase of the synchronous three-phase electric motor, a second set of permanent coils for a second phase of the synchronous three-phase electric motor, and a third set of permanent coils for a third phase of the synchronous three-phase electric motor, wherein the plurality of bypass coils comprise a first set of bypass coils for the first phase, a second set of bypass coils for the second phase, and a third set of bypass coils for the third phase, and wherein the plurality of switching devices comprise a first set of switching devices for the first phase, a second set of switching devices for the second phase, and a third set of switching devices for the third phase.

According to an implementation of the first aspect, the first set of permanent coils, the first set of bypass coils, and the first set of switching devices are in series with each other, the first set of switching devices comprise a first electrical contactor and a second electrical contactor, the system further comprises a plurality of reactor or resistor devices, a reactor or resistor device, of the plurality of reactor or resistor devices, that is in parallel with the first electrical contactor of the first set of switching devices, and the reactor or resistor device is configured to communicate power to the first set of permanent coils and the first set of bypass coils based on the first electrical contactor and the second electrical contactor being open.

According to an implementation of the first aspect, the system further comprises: a control system, wherein the control system comprises control circuitry, configured to compare the electrical characteristic associated with the one or more input currents to the plurality of switching devices with the threshold value and output the transition signal based on the comparison. The control system comprises the controller, which is configured to obtain the transition signal from the control circuitry.

According to an implementation of the first aspect, the control system comprises: a voltage source configured to provide the threshold value; and a comparator configured to compare the electrical characteristic associated with the one or more input currents to the plurality of switching devices with the threshold value from the voltage source.

According to an implementation of the first aspect, the one or more input currents comprises a first input current for a first phase, a second input current for a second phase, and a third input current for a third phase, the control system further comprises a plurality of current transformers configured to detect the first input current, the second input current, and the third input current; and output the first input current, the second input current, and the third input current.

According to an implementation of the first aspect, the control system further comprises: a plurality of diodes configured to obtain the first input current, the second input current, and the third input current from the plurality of current transformers; and rectify and sum the first input current, the second input current, and the third input current to generate a total input current, wherein the electrical characteristic is based on the total input current.

According to an implementation of the first aspect, the control system further comprises: a burden resistor configured to change the total input current into a voltage signal, wherein the electrical characteristic is based on the voltage signal.

According to an implementation of the first aspect, the control system further comprises: a plurality of amplifiers configured to: amplify the voltage signal to generate an amplified voltage signal, wherein the electrical characteristic is a voltage value associated with the amplified voltage signal; and provide the amplified voltage signal to the comparator.

According to an implementation of the first aspect, the control system further comprises a plurality of full-wave bridge configurations, wherein each of the plurality of full-wave bridge configurations comprises four diodes and configured to rectify the first input current, the second input current, and the third input current from the plurality of current transformers, and wherein the positive and negative outputs from each of the plurality of full-wave bridge configurations is connected together.

According to an implementation of the first aspect, the control system further comprises: a current-to-voltage conversion device configured to: sum the first input current, the second input current, and the third input current into a summed current; and convert the summed current into a voltage signal.

According to an implementation of the first aspect, the controller is further configured to receive a start command for starting the synchronous three-phase electric motor; and provide an initial switching command to switch to the primary position.

According to an implementation of the first aspect, the controller is further configured to: start a first timer based on receiving the start command, wherein the controller is configured to provide the first switching command to the plurality of switching devices based on obtaining the transition signal and the first timer reaching a first time interval.

According to an implementation of the first aspect, the controller is further configured to: subsequent to providing the first switching command, provide a second switching command to the plurality of switching devices to switch from the tapped position to the primary position.

According to an implementation of the first aspect, the controller is further configured to: start a second timer based on providing the first switching command, wherein the controller is configured to provide the second switching command to the plurality of switching devices based on the second timer reaching a second time interval.

According to an implementation of the first aspect, the controller is further configured to: start a third timer based on the second timer reaching the second time interval, wherein the controller is configured to provide the second switching command to the plurality of switching devices based on the third timer reaching a third time interval.

A second aspect of the present disclosure provides a system comprising: a plurality of switching devices configured to selectively switch between a tapped position and a primary position, wherein the primary position electrically communicates power to only a plurality of permanent coils of a synchronous three-phase electric motor, and wherein the tapped position communicates power to both the plurality of permanent coils and a plurality of bypass coils of the synchronous three-phase electric motor; the synchronous three-phase electric motor, comprising: a rotor; a stator concentrically disposed about the rotor; and a plurality of coils formed from conductive windings each wound around one or more of a plurality of stator teeth of the stator, wherein the plurality of coils comprises the plurality of permanent coils and the plurality of bypass coils; and a controller configured to: provide a first switching command to the plurality of switching devices to switch from the primary position to the tapped position based on a transition signal, wherein the transition signal is based on comparing an electrical characteristic associated with one or more input currents to the plurality of switching devices with a threshold value.

According to an implementation of the second aspect, the system further comprises a control system, wherein the control system comprises the plurality of switching devices; and the controller.

According to an implementation of the second aspect, the plurality of permanent coils comprise a first set of permanent coils for a first phase of the synchronous three-phase electric motor, a second set of permanent coils for a second phase of the synchronous three-phase electric motor, and a third set of permanent coils for a third phase of the synchronous three-phase electric motor, wherein the plurality of bypass coils comprise a first set of bypass coils for the first phase, a second set of bypass coils for the second phase, and a third set of bypass coils for the third phase, and wherein the plurality of switching devices comprise a first set of switching devices for the first phase, a second set of switching devices for the second phase, and a third set of switching devices for the third phase.

A second aspect of the present disclosure provides a method comprising: comparing a threshold value with an electrical characteristic associated with one or more input currents to a plurality of switching devices associated with an electric motor, wherein the electric motor comprises a rotor, a stator, and a plurality of coils formed from conductive windings each wound around one or more of a plurality of stator teeth of the stator, wherein the plurality of coils comprises a plurality of permanent coils and a plurality of bypass coils, wherein the plurality of switching devices are configured to selectively switch between a tapped position and a primary position, wherein the primary position electrically communicates power to only the plurality of permanent coils, and wherein the tapped position communicates power to both the plurality of permanent coils and the plurality of bypass coils; determining a transition signal based on the comparison; and providing a first switching command to the plurality of switching devices to switch from the primary position to the tapped position based on the transition signal.

BRIEF DESCRIPTION OF THE DRAWINGS

FIG. 12 depicts an exemplary process for controlling the switching devices in accordance with the disclosure.

FIG. 13 shows a timing chart in accordance with the disclosure.

FIGS. 14A and 14B show graphical representation of signals from the control system and the motor in accordance with the disclosure.

DETAILED DESCRIPTION

Figure 1:
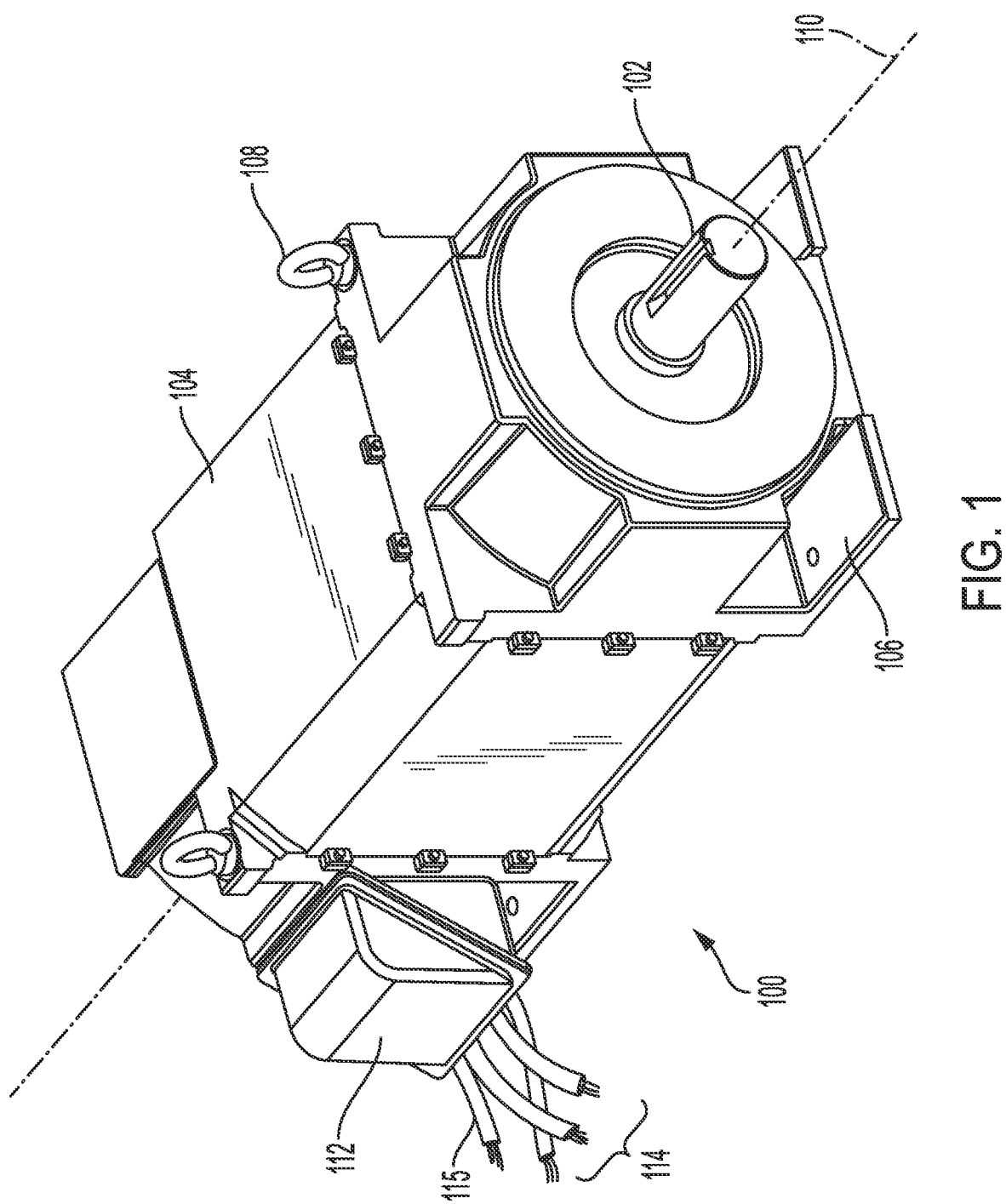
FIG. 1 is a perspective view of an electric motor delineating a rotational axis and configured for alternating current synchronous operation.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a perspective view of an electric motor delineating a rotational axis and configured for alternating current synchronous operation. For instance, FIG. 1 illustrates an example of a rotating electrical machine and particularly an electric motor 100 for converting electrical energy to a mechanical force in the form of torque that may be transmitted via a rotating motor shaft 102. The motor shaft 102 protrudes from the forward end of a motor enclosure 104 that encloses and houses the internal operating components of the electric motor 100. The motor enclosure 104 may be made from any suitable structural material such as cast iron, steel, aluminum or other suitable materials, and the enclosure may be configured according to common or standardized frame sizes that determine the location and arrangement of mounting features, such as mounting feet 106 and/or eyehooks 108. Further, the motor enclosure 104 can be designated in accordance with any of serval enclosure types, such as open drip proof (ODP) or totally enclosed fan cooled (TEFC) that determine how the electric motor 100 is constructed to interact with the operating environment to provide for cooling and protect the internal components against contaminants like moisture and dust. For reference purposes, the motor shaft 102 is supported to rotate with respect to and defines a rotational axis 110 of the electric motor 100.

To receive electric current from an external power source, the electric motor 100 can include a conduit box or terminal box 112 located at an appropriate location on the motor enclosure 104 from which extends a plurality of power leads 114 such as insulated conductive wires. The power leads 114 can be electrically connected to and complete a circuit with the external power source that provides electricity of the appropriate electrical characteristics and properties for operation of the electric motor 100. For example, the electric motor 100 can be configured to operate on poly-phase, alternating current power source. In a poly-phase power system, the plurality of power leads 114 will each conduct alternating current electricity of the same frequency and voltage to the electric motor, but the alternating current conducted in each power lead will be out of phase with that in the other power leads. Accordingly, the cyclic oscillations between 0°-360° of alternating current in each power lead 114 will be delayed or advanced with respect to that in the other power leads. By way of example, a three-phase electric motor 100 can include three power leads 114 that conduct alternating currents that are 120° out of phase with each other and a fourth neutral or ground lead 115 that may be connected to an electrical ground, for example, the motor frame, and that serves as a reference. However, while aspects of the disclosure may be described with respect to poly-phase alternating current power systems, aspects of the disclosure will also be applicable to other types of power systems and motor configurations.

Figure 2:
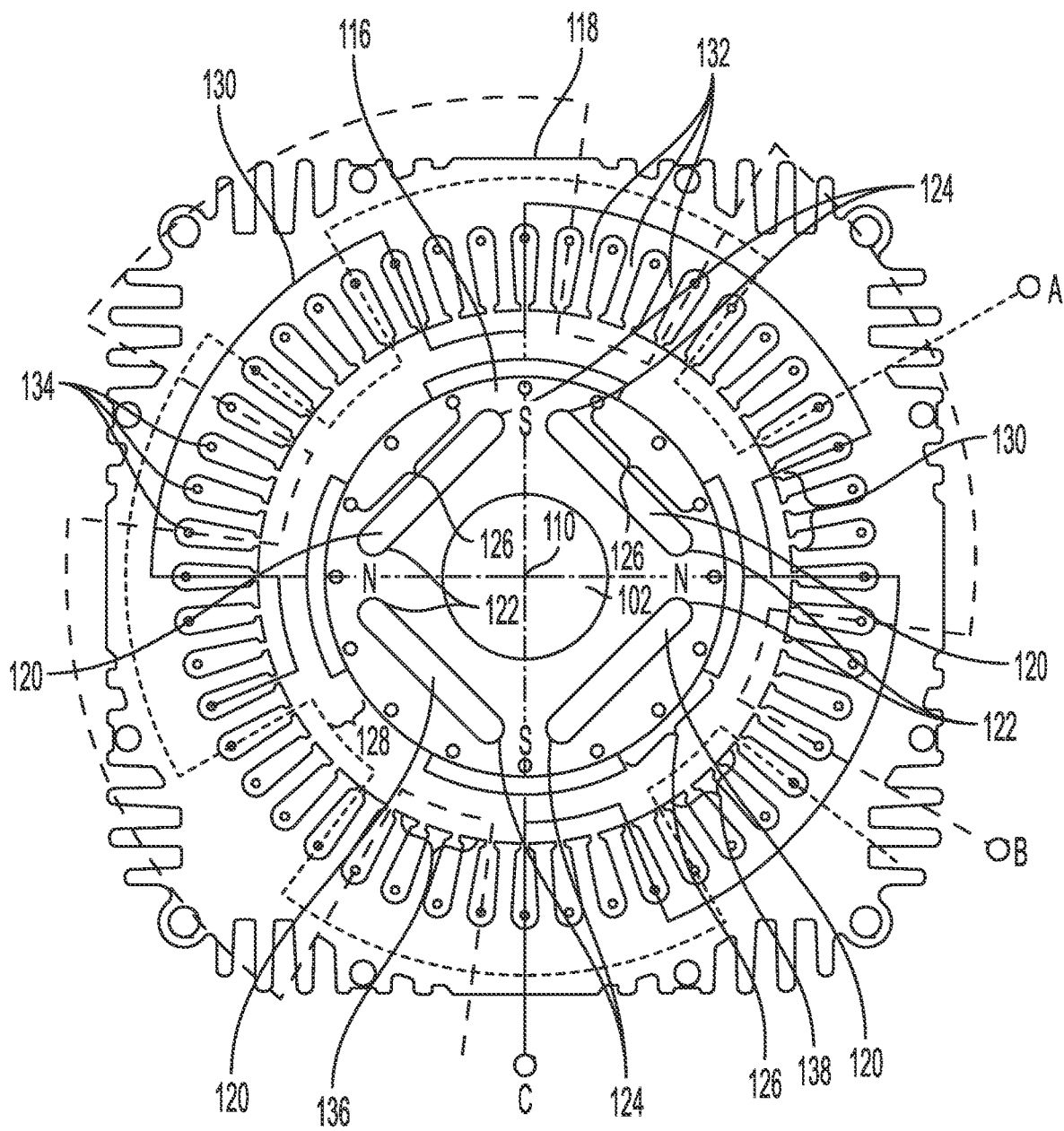
FIG. 2 is a schematic representation of a stator of the electric motor having a plurality of concentrically arranged teeth alternating with a plurality of stator slots accommodating a plurality of coils and configured for operation on poly-phased alternating current.

Referring to FIG. 2, to actuate rotation of the motor shaft 102, a rotor 116 that is generally cylindrical in shape is assembled about the extension of the shaft that is located within the enclosure 104 and is configured to electromagnetically interact with an annular stator 118 in which the rotor is disposed. The cylindrical rotor 116 and the annular stator 118 are concentrically aligned with the rotational axis 110 of the electric motor 100 defined by the motor shaft 102. To impart the electromagnetic characteristics to the rotor 116, the rotor can include one or more permanent magnets 120 that are embedded in the magnetically permeable body of the rotor. Each permanent magnet 120 has a north pole 122 and a south pole 124 and can be arranged so that the poles are proximate the cylindrical surface of the rotor 116. In an example, the permanent magnets 120 may be offset with respect to the rotational axis 110 and disposed in the rotor 116 as cords so that the north and south poles 122, 124 circumferentially alternate positions about the cylindrical surface of the rotor body, however, other arrangements of the permanent magnets are contemplated. The permanent magnets 120 are responsive to a magnetic field that may be generated by the stator and the north and south poles 122, 124 will follow the opposite polarities of the magnetic field as it circumferentially travels around the annular stator 118, thereby causing the rotor 116 and the motor shaft 102 to which it is attached to rotate. To allow rotation with respect to the motor enclosure 104, the motor shaft 102 may be rotatably supported on bearings that are fixedly mounted to the enclosure. To increase the electromagnetic interaction, the permanent magnets 120 may extend the axial length of the rotor 116.

To improve electromagnetic interaction with the generated magnetic field, the rotor 116 may be a caged rotor permanent magnet ("CRPM") type in which an inductive rotor cage 126 is embedded in the rotor body. The inductive rotor cage 126 can be in the form of a cage having a plurality of longitudinal conductive bars made from, for example, copper or aluminum that extend generally parallel with the rotational axis 110 and are circumferentially disposed around the cylindrical surface of the rotor body. The conductive bars are electrically connected at the axial ends of the rotor 116 by conductive rings. When the rotating magnetic field penetrates the rotor 116, the field may cut across the conductive bars and generate a magnetic counter-field due to Faraday's law. The induced counter-field will tend to follow the stator field, further motivating rotation of the rotor 116. The rotor cage 126 can therefore assist in starting the electric motor 100 from a standstill or locked rotor condition. In other examples, the rotor 116 can include conductive windings that receive an excitation current through brushes and function as electromagnets to generate the counter-field.

The annular stator 118 can be fixedly disposed concentrically around the rotor 116 and can be spaced apart and separated therefrom by an annular air gap 128. The stator 118 includes a stator core 130 that can be made from a magnetically permeable material such as iron or steel. In a conventional design, the stator core 130 can be made from a plurality of annularly shaped core laminations that are axially arranged as a stack and extend coaxially along the rotational axis 110. The stator core 130 may be fixed to and enclosed in the motor enclosure 104, which may include fins and the like to promote cooling.

To accommodate the conductive windings that conduct current to generate the electromagnetic field, the stator core 130 can include a plurality of stator teeth 132 that are radially arranged in the circumferential direction around the rotational axis 110 and circumferentially separated from each other by stator slots 134 radially disposed into the inner cylindrical surface of the stator core 130. Hence, between each two adjacent stator teeth 132 there is disposed a stator slot 134 so that the teeth and slots circumferentially alternate about the inner cylindrical surface of the stator core 130. The alternating stator teeth 132 and stator slots 134 may axially extend along the axial length of the stator core 130 with respect to the rotational axis 110.

The conductive windings can be elongated wires of copper or other conductive material that are wound or looped about the stator teeth 132 and accommodated in the stator slots 134. The conductive windings may be wound around a stator tooth 132 or a plurality of stator teeth 132 a number of successive times, each time being referred to as a "turn." The total number of turns of the conducting winding about the same stator tooth or stator teeth 132 forms a "coil." For example, a coil may be formed from three, four, or five turns of the conductive winding. The conductive wires of the conductive winding may then be directed around additional stator teeth 132 that are concentrically spaced from the initial coil in a continuous manner until the conductive windings circumscribe the inner circumference of the stator core 130. The path and geometry of the conductive windings around the stator core 130 can be referred to as the "winding pattern," and the winding pattern can take various arrangements and may determine the electrical characteristics and operating principles of the electric motor 100.

For example, the winding pattern may assign or allocate the coils by phases 136 and by pole-phase groups 138. Referring to FIG. 2, the phases 136 may include the coils that are electrically connected in series to the same electrical phase of the poly-phase power source. For example, referring to FIG. 3, in a three-phase power system, for the electrical motor 100 to receive three-phase power, a first phase conductor 140 may be associated with "A" phase current, a second phase conductor 142 may be associated with "B" phase current, and a third phase conductor 144 may be associated with "C" phase current. The phase conductors 140, 142, 144 may be electrically connected with the power leads 114 described with respect to FIG. 1. For reference, "A" phase conductive paths can be represented by short dashed lines, "B" phase conductive paths represented by longer dashed lines, and the "C" phase conductive paths represented by solid lines. The series of coils that are electrically connected to a respective one of the first, second, and third phase conductors 140, 142, 144 is referred to as a phase 136. The number of coils included with each phase 136 is dependent upon the number of stator teeth 132 and stator slots 134. In the example of a large electrical motor 100 of the disclosure, the stator core 130 may include forty-eight stator teeth 132 separated by forty-eight stator slots 134, such that each phase 136 includes sixteen coils (48 coils÷3 phase=16 coils/phase).

The coils may also be associated with a plurality of pole-phase groups 138, referred to herein as phase groups, with each phase group providing a single electromagnetic pole of a single phase. A pair of phase groups 138 associated with the north and south poles of a magnetic field can be located on diametrically opposite sides of the inner circumferential surface of the stator core 130. In the example of a three-phase, four pole electric motor 100 with forty-eight coils disposed about the stator 118, the electric motor 100 will include 12 phase groups 138 (48 coils÷(4 poles)=12 phase groups) with each phase group further including 4 coils. In FIG. 2, each of the twelve phase groups 138 is represented as an arc of the conductive winding with each arc spanning adjacent stator teeth 132.

In operation, when the first, second, and third phase conductors 140, 142, 144 are energized from a three phase power system with alternating electric current that is 120° degrees out of phase by the respective conductor, the current flowing in the plurality of phases 136 generates a magnetic field of changing polarity that circumferentially rotates around the rotational axis 110. As the polarity of one phase 136 connected to the first conductor 140 begins to change, e.g., from north to south, due to the periodic reversal of the direction of the alternating current associated with phase "A", the polarity of the adjacent phase 136 will become stronger because it is connected to the second or third phase conductor 142, 144 carrying current 120° degrees out of phase with the first conductor 140. The north and second magnetic poles 122, 124 of the permanent magnets 120 disposed in the rotor 116 are magnetically attracted to the opposite polarity associated with the magnetic field generated by the plurality the coils included with each of the phases 136 and will follow that polarity as it moves from one phase to an adjacent phase. The rotor 116 is thus caused to rotate with respect to the rotational axis 110.

The electric motor 100 can be a synchronous motor such that rotational speed of the rotor 116 is locked in synchronization with the frequency of the alternating current supplied to each of the three phase conductors 140, 142, 144. As explained, a synchronous motor may be difficult to start in high inertia applications where the motor shaft 102 is coupled to a large or heavy load requiring significant torque to achieve synchronization with rotating magnetic field.

Inertia is the characteristic of an object at rest to remain at rest and resist undergoing movement, and torque is the applied rotational force required to turn an object. Because of this, synchronous motors often require special starting devices or circuits, and often cannot be used in direct online ("DOL") applications or line start applications. In a DOL application, the full line power including the full line voltage of the power source is immediately applied to the motor windings associated with the stator 118 to generate the magnetic field. Under locked rotor (or zero speed) conditions, due to resistance of the rotor 116 to reach synchronous speed with the magnetic field, the inrush current drawn by the motor windings will increase. Because DOL configurations often include a circuit breaker or the like between the electric motor 100 and the power source, the circuit breaker may trip, stopping the electric motor 100.

Therefore, to facilitate starting an alternating current synchronous electric motor 100 under high inertia loads, the winding pattern is arranged so the at least one of the phases 136 includes one or more permanent coils and at least one bypass coil. For example, referring to FIG. 3, there is illustrated an exemplary phase 136 that includes both permanent coils 150 and bypass coils 152. In the example provided above, where the stator core 130 includes forty-eight coils, the phase 136 associated with one of first, second, or third phase conductors 140, 142, 144 includes sixteen total coils which may be allocated among twelve permanent coils 150 and four bypass coils 152. The permanent coils 150 are arranged so that they are permanently connected to one of the first, second, and third phase conductors 140, 142, 144 to constantly provide full line power, including the full line voltage and current, to the permanent coils 150 while the motor power switch is on and the electric motor 100 is connected to the power supply.

Under typical operating conditions, for example, when the electric motor 100 is operating at synchronous speed, the bypass coils 152 may also be conductively connected with the respective one of the first, second, and third phase conductor 140, 142, 144 to receive full line power. Because the full line power is provided to all permanent and bypass coils 150, 152 connected in series of each phase 136, the coils receive the same electrical current and generate magnetic fields of equal magnetic flux, in what may be referred to as a "normal" or "rated" flux configuration of the electric motor 100 in which the electric motor is operated at its rated or designed operating parameters. This configuration may also be referred to as the low flux configuration due to the respectively low magnetic flux generated by the plurality of permanent and bypass coils 150, 152.

The bypass coils 152, however, may be electrically disconnected from the full line power conducted in the respective first, second, or third phase conductors 140, 142, 144 at selective times so that the bypass coils are not conducting alternating current or power. The bypass coils 152 are effectively removed from the series connections of the phase 136 and only the permanent coils 150 receive full line power from the power source, and the change in the conductive path concentrates the applied alternating current in the permanent coils 150. Because the magnetic flux generated per phase 136 and per phase group 138 varies inversely with the number of coils connected in series and the number of effective turns per coil, reducing the total number of coils increases the magnitude of the generated magnetic flux. This results in a high flux configuration of the electric motor where the permanent coils 150 of the phase 136 that remain connected in series generate a magnetic field of a higher or increased magnetic flux or magnitude with respect to the rated flux configuration described above. The high flux configuration thus results in a flux boost in which the magnitude of the magnetic flux generated by the stator 118 and that attracts the permanent magnets 120 disposed in the rotor 116 is stronger. Because the mechanical torque generated by the electric motor 100 is proportional to the square of the magnetic flux applied to the rotor 116, bypassing the bypass coils 152 to increase alternating current directed to the permanent coils 150 and the magnitude of the magnetic flux generated by the permanent coils thus increases the torque output by the electric motor to move and synchronize the high inertia load.

To selectively connect and disconnect the bypass coils 152 from the respective one of the first, second, or third phase conductors 140, 142, 144 and the permanent coils 150, the phases 136 may include or be connected to the conductors via a switching device 156. The switching device 156 can be any suitable switching device for interrupting or diverting electrical current from one conductive path to another such as, for example, a relay switch or a solid state device. In the illustrated example, the bypass coils 152 can be proximately connected to the respective one of the first, second, or third phase conductors 140, 142, 144 and the permanent coils 150 can be thereafter connected in series with the bypass coils 152. Accordingly, under the rated flux configuration, the switching device 156 is set so that both the bypass coils 152 and the permanent coils 150 receive full line power. This setting for the switching device 156 is indicated by the solid line connection.

Under the high flux configuration, however, the switching device 156 can be activated to "tap" directly to the permanent coils 150, placing them in direct electrical connection with the respective one of the first, second, or third phase conductors 140, 142, 144 and bypassing or cutting out the bypass coils 152 which are electrically isolated from the power source to the electric motor 100. This setting for the switching device 156 is indicated by the dashed line connection. As explained above, under this high flux configuration, only the permanent coils 150 receive full line current and accordingly generate magnetic fields of increased magnitude. To restore the rated flux configuration, the switching device 156 can be reconfigured from the tapped position to directly connect with the bypass coils 152.

The switching device 156 may be incorporated within the enclosure of the electric motor 100 or may be located externally of the motor. In the example of an external switching device, additional power leads 114 as shown in FIG. 1 may be directed from the electric motor 100 and, in the example of the three-phase motor, an additional three power leads may be included. In addition, in the example of a three-phase motor, the switching device 156 and an additional lead may be included for each of the three phases 136 included with the electric motor 100.

Figure 4:
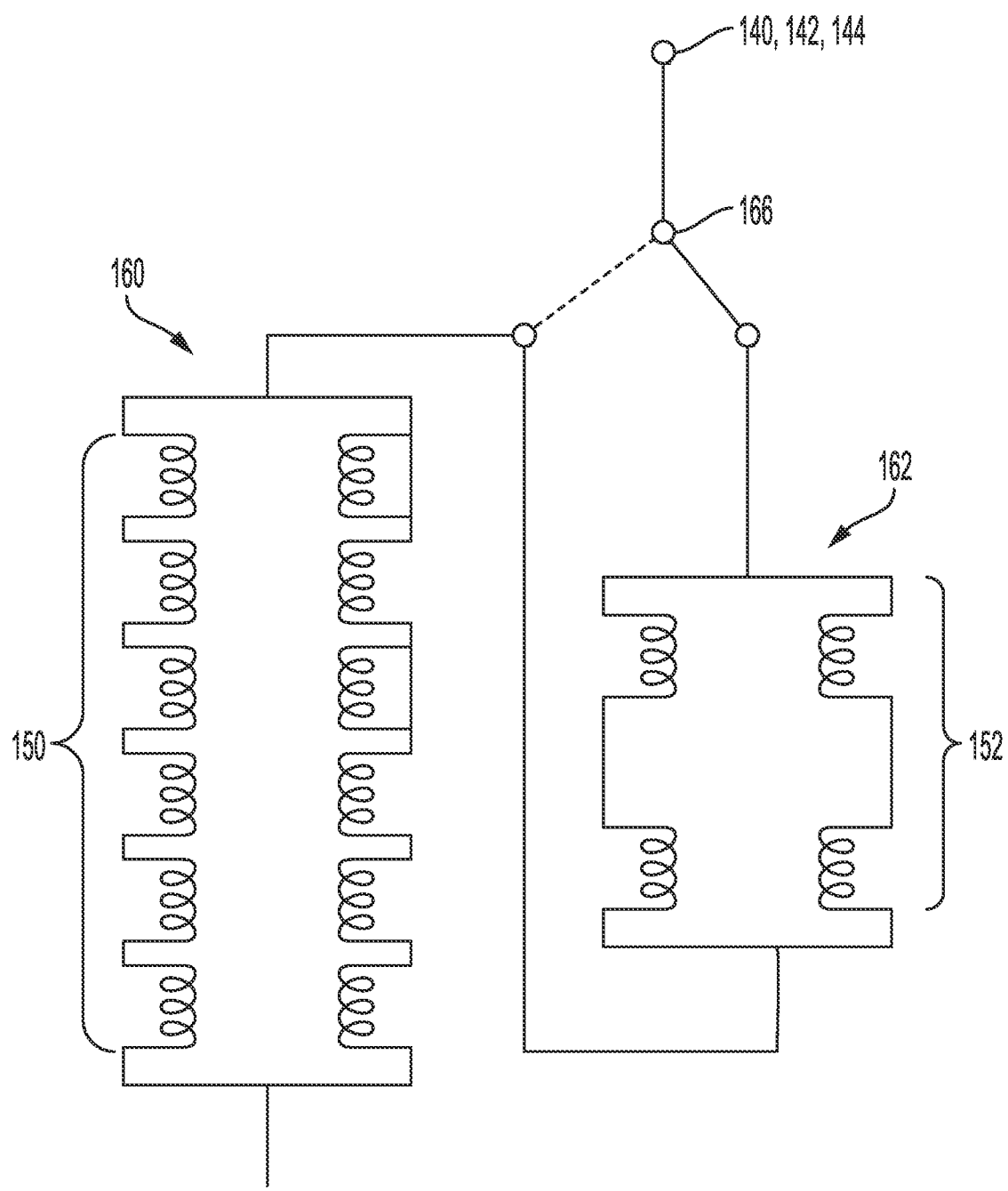
FIG. 4 is a schematic representation of another arrangement of a selectively reconfigurable arrangement of coils to alternatively produce high flux state and rated flux state in accordance with the disclosure.

Referring to FIG. 4, there is illustrated another winding pattern for a phase 136 of the electric motor 100 that is arranged to implement both a rated flux configuration when the electric motor is operating at synchronous speed and a high flux configuration when starting from standstill or a locked rotor condition. The example illustrated in FIG. 4 can be implemented where the stator 118 has many teeth and slots such that each phase 136 has several permanent coils 150 and bypass coils 152. The permanent coils 150 can be arranged in a first parallel circuit 160 in which permanent coils are evenly allocated to one of the two parallel branches. The bypass coils 152 can also be arranged in a second parallel circuit 162 in which the bypass coils are evenly allocated to one of the two parallel branches. The first parallel circuit 160 and the second parallel circuit 162 can be arranged in series with each other. The first and second parallel circuits 160, 162 can also be selectively connected to the respective one of the first, second, and third phase conductors 140, 142, 143 via the switching device 166.

To implement the rated flux configuration, the switching device 166 can be set so that the phase conductors 140, 142, 144 are directly connected to the second circuit 162 of bypass coils 152 upstream of the first circuit 160 so that all coils of the phase 136 receive full line power including full line voltage and current. To implement the high flux configuration, the switching device 166 taps directly to the first circuit 160, thereby bypassing the second circuit 162, and the respective one of the first, second, and third phase conductors 140, 142, 144 directs full line current to the permanent coils 150 increasing the magnetic flux generated therein. This setting for the switching device 166 is indicated by the dashed line configuration. The foregoing winding pattern enables further redirection of the current through the phase 136 through the inclusion of the first and second parallel circuits 160, 162 to improve electrical characteristics and operation of the electric motor 100.

Figure 5:
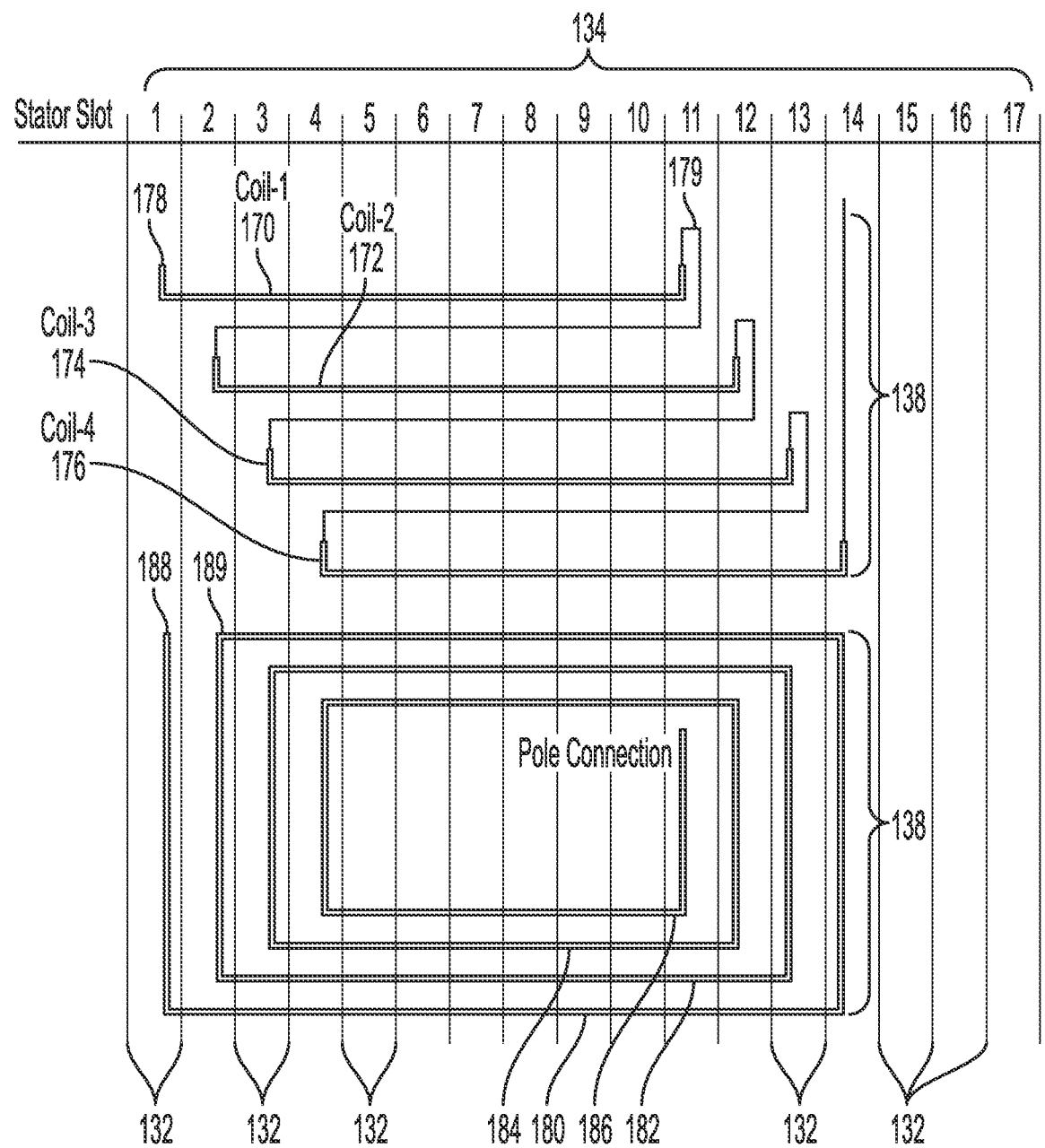
FIG. 5 is a schematic representation of a lap wound arrangement and a concentric wound configuration for the stator windings of the electric motor in accordance with the disclosure.

The disclosure can be implemented with various winding patterns that have been developed in the art for forming and arranging the phases and phase groups. Referring to FIG. 5, there is a graphic representation of two winding patterns including a "lap winding" and a "concentric winding." In a lap winding pattern, shown toward the top of FIG. 5, one side of each coil that makes up a phase group 138 will be positioned at the bottom of a particular stator slot 134 while the other side will be positioned at the top of another stator slot circumferentially located several stator slot positions away. The "side" of a coil may be the series of winding half turns aligned in the same axial direction of the plurality of winding turns that form the coil. Bottom and top of the stator slot 134 may refer to the radial depth (or height) of the stator slot disposed into the stator core. The coil may be wound around one or more stator teeth 132 (represented by vertical lines) and each coil in the phase groups should encompass the same number of stator teeth. Moreover, the respective sides of every coil, or series of winding half turns, will be separated by and encompass the same number of adjacent stator slots 134. Thus, the individual coils of a phase group 138 overlap each other in the stator slots 134 included within the arc that defines the phase group 138.

Because each phase group 138 includes multiple coils, the voltage applied to the phase groups is distributed among the plurality of coils in the group. The distribution factor ("$K_d$") represents the ratio of the vector sum of the voltage if all conductive windings are distributed among the plurality of coils allocated in each phase group, as determined by the phase and pole numbers of the electric motor, compared with the vector sum of the voltage if all conductive windings are assumed concentrated into a single coil. The distribution factor $K_d$ represents the ratio of the voltage if all the turns of a group are concentrated into a single coil compared to the vector sum if the turns are distributed over the coils of a 60° phase belt.

$$K_d = \frac{\text{Vector resultant voltage of distributed coils}}{\text{Vector resultant voltage of a single concentrated coil}} \quad \text{Eqn. 1}$$

The resultant voltage of a single concentrated coil can be determined from:

$$R_{VCC} = V_C(\text{\# coils per phase group}) \quad \text{Eqn. 2:}$$

Where $V_C$ is the voltage of each coil of the phase group.

The resultant voltage of the distributed coils ($R_{VCD}$) is the vector added sum of the individual coils. Assuming the individual coils are distributed within a specific band or belt (referred to as a phase belt) of the 360° cycle of alternating current, for example, 60° electrical degrees in the case of a four pole, three phase, 48 slot motor, the resultant voltage $R_{VCD}$ is:

$$R_{VCD} = V_C(1\angle 15 + 1\angle 30 + 1\angle 45 + 1\angle 60) \quad \text{Eqn. 3:}$$

In the example of the electric motor described herein, where each phase group 138 includes four coils, the windings that comprise the coils may be set out as illustrated in FIG. 5. For example, a first coil 170 of the phase group 138 may encircle ten stator teeth, and thus the coil sides are located in stator slot no. 1 and stator slot no. 11. The span or distance between stator slot no. 1 and stator slot no. 11 can be referred to as the throw or pitch of the coil. The second coil 172 may be circumferentially offset by one stator slot 134 so that the coil sides are located in stator slot no. 2 and stator slot no. 12 respectively. Similarly, the third coil 174 can be offset one stator slot 134 to encompass stator slot nos. 3-13 and the fourth coil 176 can be offset one stator slot 134 to encompass stator slots nos. 4-14.

The throw or pitch of the coil can be used to calculate a pitch factor ("Kr") which relates the number of stator teeth the coil actually encircles with the number of stator teeth that can theoretically be allocated to the phase groups 138 of the electric motor. For a four pole electric motor having forty-eight stator teeth:

$$K_p = \sin(\text{teeth per coil}/(48 \text{ teeth}/4 \text{ poles})) = \sin(\text{teeth per coil}/12) \quad \text{Eqn. 4:}$$

To switch the motor between the rated flux configuration during synchronous operation and the high flux operation at startup, one of first, second, third, or fourth coils 170, 172, 174, 176 can be designated as the bypass coil and can be selectively disconnected from the respective phase conductor 140, 142, 144 and isolated from the power source. For example, phase group 138 can normally be directly connected to the respective phase conductor 140, 142, 144 at a primary position 178 at the start of the first coil 170, so that the second, third, and fourth coils 172, 174, 176 are connected in series to the first coil receive full line power including full line current. To switch to the high flux configuration, the respective phase conductor 140, 142, 144 can be tapped to a tap position 179 and directly connected with the second, third, and fourth coils 172, 174, 176 and thereby bypass the first coil 170. Accordingly, only the second, third, and fourth coils 170, 172, 174 receive fully line current causing them to generate a larger magnetic flux.

If the number of winding turns that comprise a coil is equal among the first, second, third, and fourth coils 170, 172, 174, and 176, then bypassing the first coil 170 should reduce the quantity of conductive windings of the phase group by 25% and result in a corresponding increase in the full line power directed to the remaining 75% of conductive windings in the remaining three coils. However, the coils of the phase group 138 may include different numbers of winding turns, referred to as turns-per-coil ("TPC"), which may affect the change in magnitude of magnetic flux generated per coil between the rated flux configuration and high flux configuration. This is because the magnetic flux produced is proportional to the number of winding turns included in a coil.

For example, the phase group 138 may have a TPC pattern of 5-4-4-4, meaning the first coil 170 includes five winding turns and the second, third, and fourth coils 172, 174, 176 each include four winding turns. If the first coil 170 is designated as the bypass coil, isolating and bypassing the first coil will have a correspondingly larger effect on the increase of magnetic flux in the high flux configuration by removing a greater of winding terms from the phase group 138. By way of example only, the ratio of the flux boost between the rated flux and high flux configurations may be 1.385.

If the phase group 138 has a TPC pattern of 4-5-4-4, meaning the second coil 172 includes five winding turns and the first coil 170 includes four winding turns (along with the second and third coils 174, 176), then bypassing the first coil 170 has a more limited effect because the number of winding turns per coil that have been isolated from full line power are relatively fewer. By way of further example, the ratio of the flux boost between the rated flux and high flux configurations may be 1.285. It will be appreciated that different TPC patterns can be employed to produce different flux ratios.

Based on the pitch factor $K_P$, distribution factor $K_d$, TPC, and other characteristics of the electric motor, a theoretically equivalent circuit can be determined that converts these characteristics into the effective series conductor per phase of the electric motor, in which the electric motor is conceptualized as a plurality of conductors connected in series. The effective series conductors per phase can be determined as:

$$\textit{Eff. Series Conductors per Phase} = \frac{2 \times (\text{Turns/coil}) \times (\text{slots/phase}) * (K_p) * (K_d)}{\text{Number of parallel circuits}} \quad \text{Eqn. 5}$$

According to the above equation, and as indicated by the above discussion of winding turns per coils and the magnetic flux produced per coil, increasing the TPC or turns per coil will increase the effective series conductors per phase.

Referring to the bottom of FIG. 5, in the concentric winding pattern, the coils within the phase group 138 are organized concentrically such that the sides of each coil are separated by a different number of slot positions. For example, the first coil 180 may be the outermost coil and may encircle fourteen stator teeth. To assume a concentric position, the sides of the first coil 180 can located in stator slot no. 1 and stator slot no. 14. The second coil 182 can be disposed concentrically inward of the first coil 180 and can be wound around eleven stator teeth so that the sides of the second coil are located in stator slot nos. 2 and 13. Likewise, the third coil 184 can be wound inward of a smaller number of stator teeth 132 with its coil sides located in stator slot nos. 3 and 11, and the concentrically inward most fourth coil 186 can have its coil sides located in stator slot nos. 4 and 11.

Because the coil pitch differs between the first, second, third, and fourth coils 180, 182, 184, 186, and assuming the same number of turns-per-coil per coil, each coil includes a different winding turns of differing lengths, which increases from the concentrically innermost forth coil 186 to the concentrically outermost first coil 180. Accordingly, designating different coils in the concentric winding pattern as the bypass coil can alter the flux ratio between the rated flux configuration and the high flux configuration of the electric motor. For example, in the rated flux configuration, the first, second, third, and fourth coils 180, 182, 184, 186 of the phase group 138 can be electrically connected in series, with the first coil 180 being directly connected to the respective one of the first, second, or third phase conductors 140, 142, 144 at a primary position 188. All four coils therefore receive full line power. If the first coil 180 is designated as the bypass coil, the first coil can be bypassed by directly connecting the third coil 184 at a tap position 189 so that only the second, third and fourth coils 184, 182, 180 receive full line power. Because the magnetic flux varies inversely with the number of coils in the series circuit, electrically disconnecting the bypass coils increases the generated magnetic flux.

Ideally, a lap winding pattern and a concentric winding pattern for the same sized electric motor would have the same starting and performance characteristics; however, the geometric differences between the lap and concentric patterns results in certain performance differences. To evaluate and reduce those differences, the equation for the effective series conductors per phase described above can be used. In particular, during design of the electric motor, the variables for the equation can be determined for both the lap winding pattern and the concentric winding pattern and adjusted until equivalence in the performance characteristics is obtained.

Because the outmost first coil 180 includes a greater of winding turns than the second, third, and fourth coils 182, 184, 186, bypassing the first coil has a substantially greater effect on the flux boost between rated flux and high flux operation. In an example, to better balance the effect of bypassing certain coils in the concentric winding pattern, the number of winding turns per coil, or TPC, can be varied among the first, second, third, and fourth coils 180, 182, 184, 186. For example, the phase group 138 can have a TPC pattern of 4-5-4-4 meaning the second coil 182 includes five winding turns and the first, third, and fourth coils 180, 184, 186 include four turns. The increased number of winding turns associated with the second coil 182 can temper the effect of bypassing the first coil 180. Alternatively, the phase group 138 can have a TPC pattern of 5-4-4-4, thereby including five winding turns in the first coil 180 such that bypassing the first coil has an increased effect on the magnetic flux ratio when bypassed. In a further example, the location of the tap position 189 can be changed so that different coils are bypassed, such as the concentrically innermost first coil 180.

Figure 6:
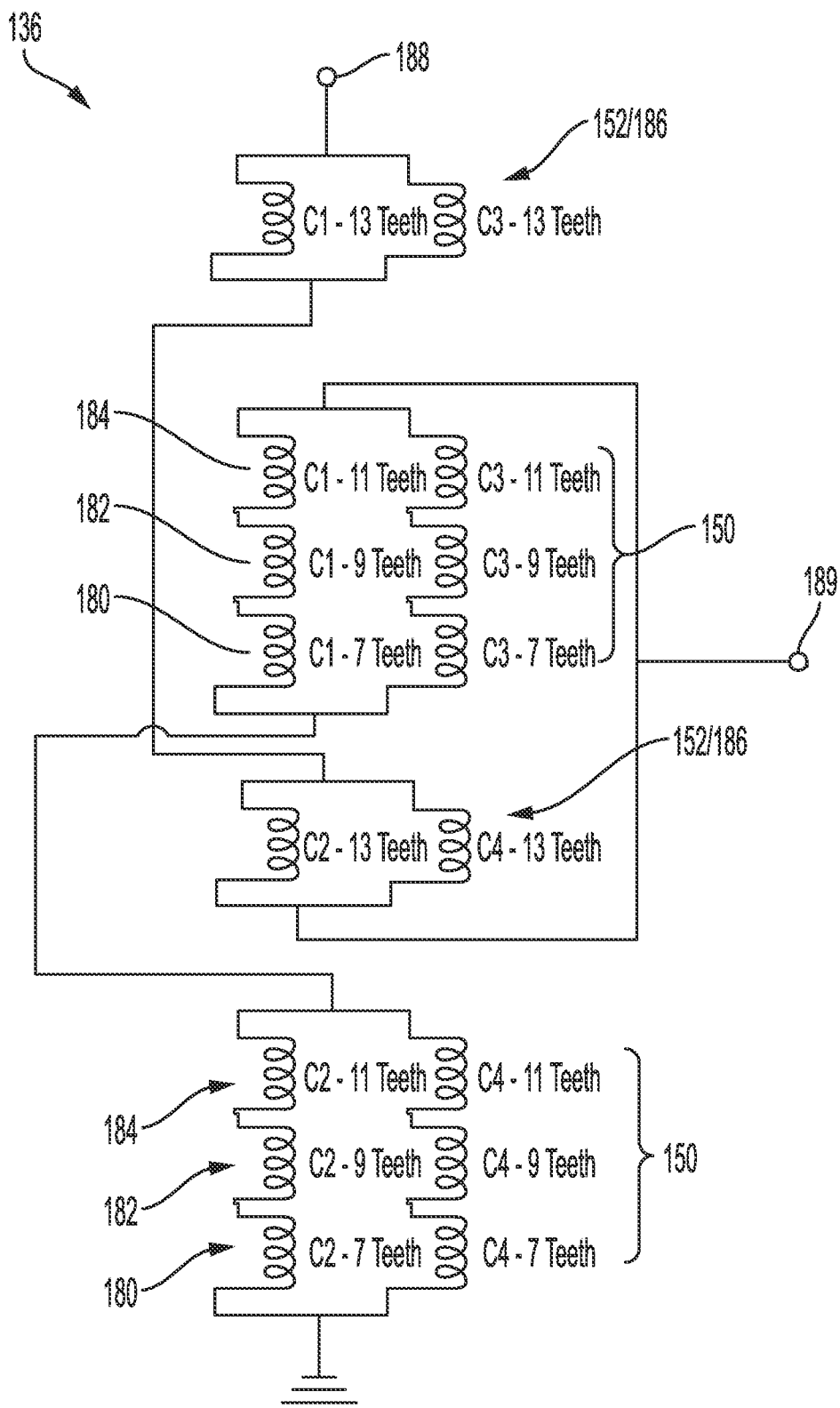
FIG. 6 is an alternative schematic representation of selectively arranging the coils of a phase using different power leads.

Referring to FIG. 6, there is illustrated an example of a phase 136 having a winding pattern to implement both rated flux and high flux configurations in a concentric winding pattern. The phase 136 may include a total of sixteen coils and includes both permanent coils 150 arranged to continuously receive full line power and bypass coils 152 that may be selectively isolated and cut from the full line power source. To realize the concentric winding pattern, the bypass coil 152 correspond to the concentrically outermost first coil 180 and the permanent coils 150 may correspond to the concentrically inwards second, third, and fourth coils, 182, 184, 186 described above with respect to FIG. 5.

Accordingly, the four coils that correspond to the bypass coils 152 of the phase 136 are wound around thirteen stator teeth 132 and are located in stator slot nos. 1 and 14. Likewise, proceeding concentrically inwardly, the four permanent coils 150 in the phase 136 corresponding to the second coil 182 of the concentric pattern are wound around eleven stator teeth 134 and are located in stator slot nos. 2 and 13; the four permanent coils 150 of the phase 136 corresponding to the third coil 184 of the concentric pattern are wound around nine stator teeth 134 and are located in stator slot nos. 3 and 12; and the four permanent coils 150 of the phase 136 corresponding to the fourth coil 186 of the concentric winding pattern are wound around seven stator teeth 134 and are located in stator slot nos. 4 and 11.

Similar to the winding pattern of FIG. 4, the phase 136 of FIG. 6 can be arranged in different parallel and series circuits. To implement the rated flux configuration, the primary position 188 via which the phase 136 connects to a respective one of the first, second, or third phase conductors 140, 142, 144 is located electrically proximate the first coils 180 corresponding to the bypass coils 152. Both permanent and bypass coils 150, 152 of the phase 136 and the first, second, third, and fourth coils 180, 182, 184, and 186 of the concentric winding pattern receives full line power.

To implement the high flux configuration, the respective one of the first, second, or third phase conductors 140, 142, 144 is tapped to the tapped position 189 that is electrically proximate to the second coils 182 of the concentric winding pattern. Accordingly, only the second third, and fourth coil 182, 184, 186 corresponding to the bypass coils 150 and arranged in series receive full line power with the first coils 180 bypassed.

Figure 7:
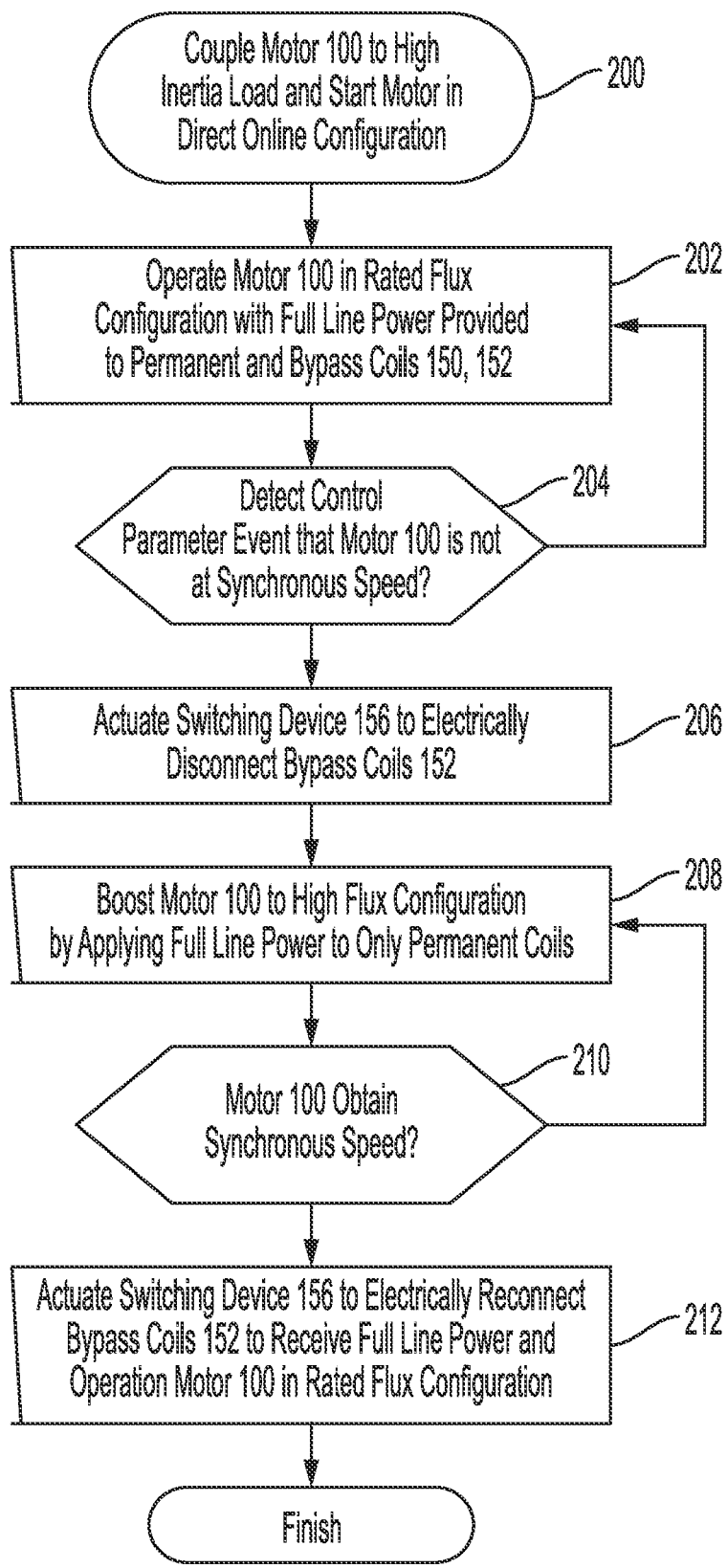
FIG. 7 is a flow diagram of an exemplary method of selectively configuring the coils of the electric motor between a high flux and a rated flux configuration at startup.

Referring to FIG. 7, there is illustrated an exemplary process by which the electric motor 100 can synchronize a high inertia load to which the motor is coupled from a standstill condition in accordance with the disclosure. As described, the electric motor 100 may be a synchronous poly-phase motor with a plurality of magnetic poles with a rotor cage. In an initial starting step 200, the electric motor 100 is coupled to the high inertia load and started in a direct online ("DOL") configuration whereby the full rated power from the power source is applied to the permanent coils and the at least one bypass coil of the electric motor that may be electrically connected in series. During this time, in rated flux operation 202, the electric motor 100 operates in a rated flux condition with alternating current distributed to both the permanent and bypass coils 150, 152 such that all coils generate magnetic fields of generally equal magnetic flux.

To generate a flux boost as the electric motor attempts to reach synchronous speed, the electric motor can be reconfigured from the rated flux configuration to the high flux configuration by electrically disconnecting the bypass coils. Disconnecting the bypass coils can be accomplished with a switching device 156 that is operatively associated with the power leads to electric motor. To actuate the switching device 156, a first detection step 204 detects a control parameter that is utilized to actuate the switching device 156 in an actuation step 206 and bypass the bypass coils 152.

The switching device 156 can be timer that is configured to actuate after a predetermined acceleration time during which the electric motor attempts to accelerate to synchronous speed. The switching device 156 can switch from directly connecting the bypass coils to the power source to a tapped position in which only the permanent coils are directly connected to the power source. Alternatively, the switching device 156 may be a relay switch that can be actuated by a control parameter. The control parameter can be the rotational speed of the electric motor 100. For example, if the motor is operating below synchronous speed, the relay switch 156 can actuate to selectively operate the motor in the high flux configuration. In another example, the control parameter can be the current drawn by the electric motor 100 at startup. If the electric motor 100 is operating below synchronous speed, the inrush current drawn may be higher than rated current, which can be utilized as the control signal to actuate the relay switch.

In the high flux configuration during high flux operation 208 with the bypass coils 152 disconnected from and bypassed by the power source, the full line power is only delivered to the permanent coils 150. Because the magnetic flux generated by the coils, for example, per phase group, varies inversely with the number of coils connected in series, reducing the total number of coils increases the magnitude of the generated magnetic flux. This creates the flux boost of the rotating magnetic field that can increase the magnetic attraction of the permanent magnetics in the rotor that in turn increases the output torque of the electric motor 100. The additional torque due to the flux boost can be used to synchronize movement of the high inertia load to which the electric motor is coupled. In possible examples, the flux boost generated in the high flux configuration can be for example 1.3 to 1.5 times the rated flux generated in the rated flux configuration.

When the electric motor achieves synchronous speed, which can be determined in a synchronization detection step 210 or after a predetermined time period, the electric motor can be reconfigured to again operate in the rated flux configuration since the additional torque generated in the high flux configuration is no longer necessary to initiate movement of the high inertia load. This can be accomplished in a second actuation step 212 in which the switching device 156 is actuated to directly connect the bypass coils 152 with the power source. Because the bypass coils 152 are connected in series with the permanent coils 150, all coils in the motor receive full line power and generate magnet fields of reduced magnetic flux. In the example where the switching device 156 is a timer, a predetermined synchronization period may be used as a control parameter to actuate the switching device. The synchronization period and the acceleration period described above can be determined empirically. In the example where the switching device is a relay switch, the control signal can be rotational speed of the electric motor, which would be about equal with the synchronous speed, or can be the electric current drawn, which would fall to the rated current.

As explained above, it may be difficult to start a synchronous electric motor in high inertia applications where a motor shaft (e.g., the motor shaft 102) is coupled to a large or heavy load requiring significant torque to achieve synchronization with a rotating magnetic field. Therefore, the present disclosure provides a synchronous electric motor that includes bypass coils (e.g., bypass coils 152) and permanent coils (e.g., permanent coils 150), which are used to start the electric motor so as to achieve synchronization when coupled to high inertia loads. A switching device (e.g., the switching device 156 and/or the switching device 166) may be used to switch into a tapped position that electrically connects only the permanent coils to a power load or a primary position that electrical connects both the bypass coils and the permanent coils to the power load. As mentioned above, the switch device may be and/or include a timer that is configured to actuate after a predetermined amount of time and/or a relay switch that is actuated by a control parameter. The control parameter may be associated with a rotational speed of the electric motor and/or a current drawn by the electric motor 100 at startup. Additionally, and/or alternatively, the switching device may be controlled using a controller and/or a control circuit. This will be described in further detail below.

Figure 8:
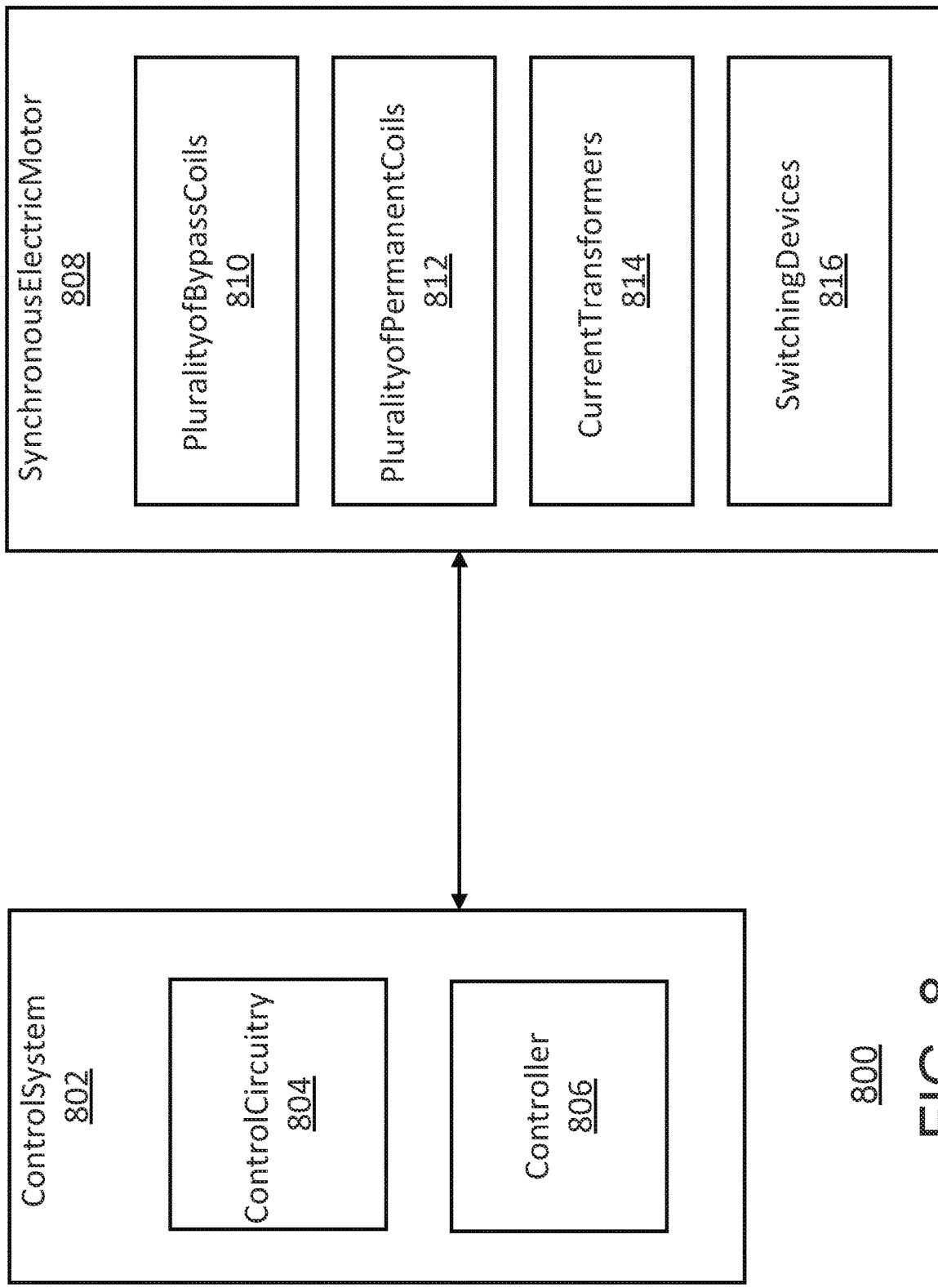
FIG. 8 is a schematic illustration of a block diagram depicting a control scheme for controlling a switching device in accordance with the disclosure.

FIG. 8 is a schematic illustration of a block diagram depicting an environment for controlling a switching device in accordance with the disclosure. For example, the environment 800 includes a control system 802 and a synchronous electric motor 808. The control system 802 includes control circuitry 804 and a controller 806. The synchronous electric motor 808 includes a plurality of bypass coils 810, a plurality of permanent coils 812, current transformers (CTs) 814, and switching devices 816.

In some variations, an example of the electric motor 808 is described in U.S. patent application Ser. No. 16/986,532, titled "ELECTRIC MOTOR WITH SELECTIVE FLUX STATOR," which is incorporated by reference in its entirety herein. In some instances, the synchronous electric motor 808 may be the electric motor 100 that is described above in FIGS. 1-7. For example, the synchronous electric motor 808 may be a three-phase motor. The bypass coils 810 and the permanent coils 812 may include the bypass and permanent coils for all three phases. In other words, each phase (e.g., phase 136) of the motor 808 includes both permanent coils such as the permanent coils 150 and bypass coils such as the bypass coils 152.

The switching devices 816 may be any suitable switching device for interrupting and/or diverting electrical current from one conductive path to another such as, for example, a relay switch, a solid state device, an electric switch, and/or one or more contactors. For example, each phase of the three-phase motor 808 may include two switching devices 816 (e.g., contactors). The contactors may close or open during start-up so as to provide the AC current to solely the permanent coils 812 or to both the permanent coils 812 and the bypass coils 810. For instance, during normal operation (e.g., after synchronization), a first switching device 816 (e.g., a first contactor) is closed such that electrical current is provided to both the permanent coils 812 and the bypass coils 810. However, due to a large or heavy load requiring significant torque, it might be difficult to reach synchronization solely using a primary position. As such, the present disclosure describes using two switching devices (e.g., two contactors) for each phase that alternate using a primary position and a tapped position so as to permit the motor 808 to reach synchronization.

For example, after start-up, the first contactor 816 may close so as to provide electrical current to both the permanent coils 812 and the bypass coils 810. Then, the first contactor may open and the second contactor may close so as to provide electrical current to solely the permanent coils 812. By having the second contactor closed such that only the permanent coils 812 are receiving electrical current, there is less inductance/resistance. As such, more current flows through the coils, which causes a greater amount of magnetic flux in the windings. This permits the rotor to be synchronized with the magnetic field easier, but if left for too long, this may cause the motor 808 to overheat. As such, subsequent to closing the second contactor and opening the first contactor, the first contactor may close again and the second contactor may open such that electrical current is provided to both the permanent coils 812 and the bypass coils 810.

The switching device 816 being two contactors for each phase of the three-phase motor 808 is merely exemplary. In some instances, the switching device 816 may be and/or include solid-state alternating current (AC) switches such as insulated-gate bipolar transistors (IGBTs), silicon controlled rectifiers (SCRs), and/or any other type of device that allows switching between the primary and tapped positions. The AC switches may be arranged in a manner with or without diodes that may control the switching of the motor current between the permanent coils 812 and the bypass coils 810.

Figure 9:
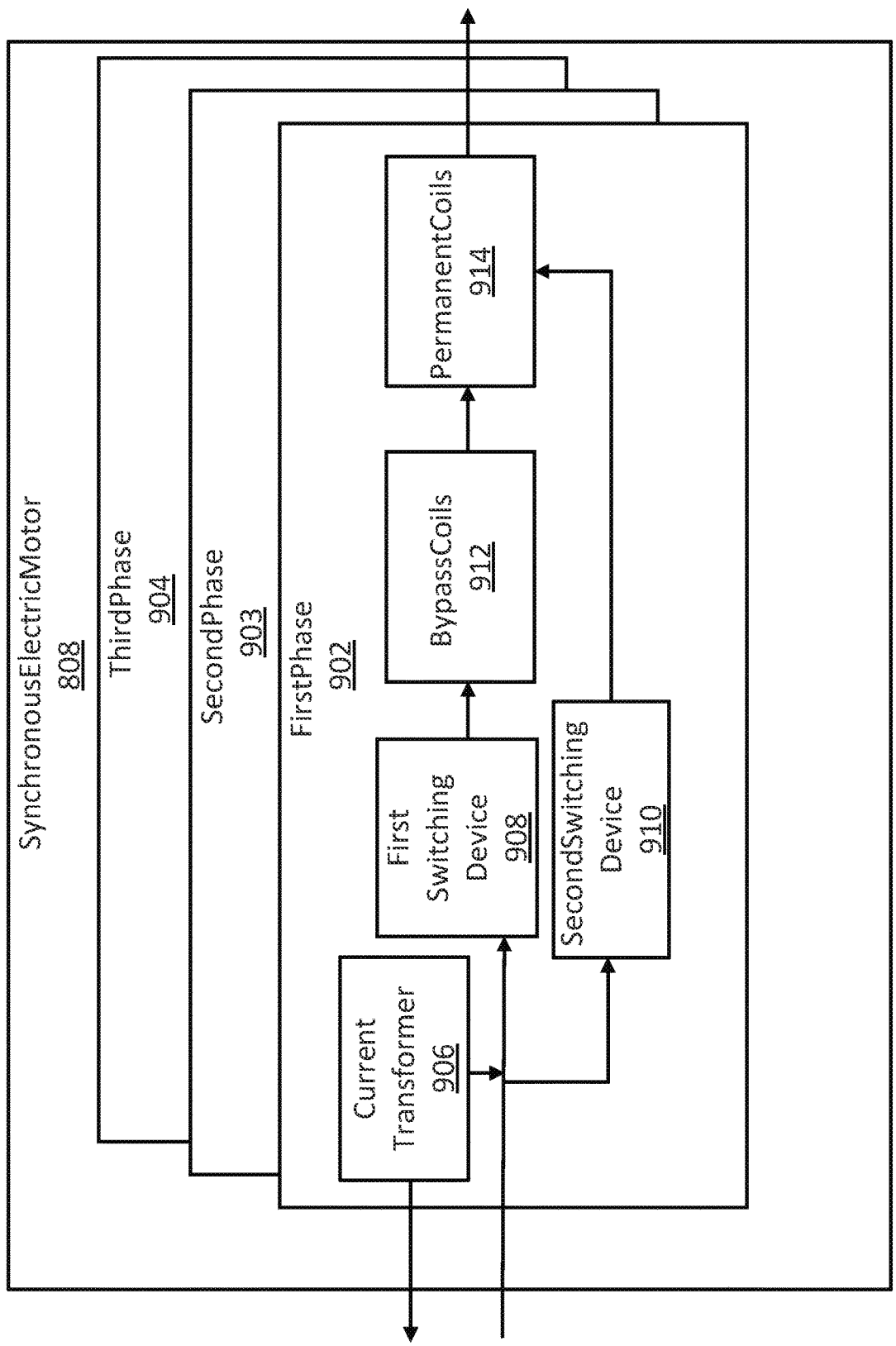
FIG. 9 is a schematic illustration of a block diagram depicting an exemplary synchronous electric motor in accordance with the disclosure.

The control scheme of opening/closing the first and second contactors 816 will be described below. For instance, the motor 808 includes CTs 814. CTs 814 are a type of transformer that are used to detect AC current being provided to the switching device 816/the coils 810 and 812, and provide an AC current to the control circuitry 804. For example, each phase of the motor 808 may include a CT 814 that is positioned between an external source and a switching device 816. The CT 814 monitors the current entering each phase of the three-phase motor 808. For instance, as mentioned above, the motor 808 may include a motor box or conduit box (e.g., box 112) that extends one or more power leads (e.g., leads 114) to each phase of the three-phase motor. The CTs 814 may be configured to detect the current being provided to each phase of the motor 808 and provide the detected current to the control system 802 (e.g., the control circuitry 804). In some instances, the CTs 814 may further adjust the current prior to providing the current to the control circuitry 804. For instance, the CTs 814 may reduce or multiply an AC current (e.g., if the CT 814 is a 1000:5 CT, the CT 814 may adjust the current by a ratio of 1000:5 prior to providing the current to the control circuitry 804). In some examples, the CTs 814 may be part of and/or included within the control system 802 and/or the control circuitry 804. The CTs are shown in FIG. 9 and will be described in further detail below.

The control system 802 includes control circuitry 804 and one or more controllers 806. The control circuitry 804 includes one or more hardware circuitry elements (e.g., one or more comparators and/or amplifiers) that are configured to obtain one or more currents from the CTs 814 and provide one or more signals (e.g., transition signals or transition pulses) to the controller 806. For example, the control circuitry 804 may compare an electrical characteristic (e.g., a voltage or current signal) associated with the one or more currents from the CTs 814 to a threshold (e.g., a voltage or current threshold). Based on the comparison, the control circuitry 804 may provide one or more signals such as transition signals to the controller 806.

The controller 806 is in electrical communication with the control circuitry 804 and the switching devices 816. The controller 806 is not constrained to any particular hardware, and the controller's configuration may be implemented by any kind of programming (e.g., embedded Linux) or hardware design—or a combination of both. For instance, the controller 806 may be formed by a single processor, such as general purpose processor with the corresponding software implementing the described control operations. On the other hand, the controller 806 may be implemented by a specialized hardware, such as an ASIC (Application-Specific Integrated Circuit), an FPGA (Field-Programmable Gate Array), a DSP (Digital Signal Processor), or the like.

In operation, the controller 806 obtains one or more signals from the control circuitry 804. Based on the one or more signals, the controller 806 provides one or more control signals to the switching devices 816 such as opening or closing the switching devices 816 so as to provide the electrical current to the permanent coils 812 and the bypass coils 810 or provide the electrical current to solely the permanent coils 812.

In some instances, the control circuitry 804 may be implemented as software (e.g., one or more instructions stored in a non-transitory computer readable medium) rather than hardware elements. For instance, the controller 806 may execute the one or more instructions stored in the non-transitory computer readable medium to perform the functionalities of the control circuitry 804.

In some examples, the control circuitry 804 may be hardware elements that are incorporated within the motor 808 rather than in the control system 802. In other examples and as mentioned above, the control circuitry 804 as well as the switching devices 816 and/or the current transformers 814 may be located externally of the motor 808 (e.g., both the switching devices 816 and the control circuitry 804 may be located in the control system 802). In yet other examples, the controller 806, the control circuitry 804, and the switching devices 816 may be incorporated within the motor 808.

FIG. 9 is a schematic illustration of a block diagram depicting an exemplary synchronous electric motor 808 in accordance with the disclosure. The motor 808 is a three-phase electric motor with a first phase 902, a second phase 904, and a third phase 906. Each phase includes a plurality of components such as the current transformer 906, the first and second switching devices 908 and 910, bypass coils 912, and permanent coils 914. As such, the CTs 814 may include the CT 906 for the first phase 902, the CT 906 for the second phase 903, and the CT 906 for the third phase 904. Similarly, the switching devices may include the first and second switching devices 908 and 910 for the first phase 902, the first and second switching devices 908 and 910 for the second phase 903, and the first and second switching devices 908 and 910 for the third phase 904. The bypass coils 810 may include the bypass coils 912 for the first, second and third phases 902, 903, and 904. The permanent coils 812 may include the permanent coils 914 for the first, second and third phases 902, 903, and 904.

In some instances, the switching devices 908, 910, the bypass coils 912, and the permanent coils 914 may be similar to the switching devices, bypass coils, and permanent coils described above in FIGS. 3 and 4. For example, referring to FIGS. 3 and 4, the bypass coils 912 may be similar to the bypass coils 152 and the permanent coils 914 may be similar to the permanent coils 150. For instance, the permanent coils 914/150 may be in series with the bypass coils 912/152. In some variations, the permanent coils 914 and/or the bypass coils 912 may include different numbers and/or arrangements of coils than the coils 150/152 shown in FIGS. 3 and 4, but may still be in series with each other as well as with the switching devices 908 and 910.

The switching devices 908 and 910 may be similar to switching devices 156 or 166 that switches between providing electrical energy (e.g., electrical current, power, or voltage) to solely the permanent coils 914/150 or to both the permanent coils 914/150 as well as the bypass coils 912/152. For instance, the switching devices 908 and 910 may be two contactors (e.g., electrical contactors) that may be configured to be in a tapped position or in a primary position. The primary position may indicate that a first switching device 908 (e.g., a first contactor that connects to the bypass coils 912/152) is closed and a second contactor 910 is open. The tapped position may indicate that the second contactor 910 (e.g., the contactor that connects only to the permanent coils 914) is closed and the first switching device 908 is open.

The current transformer 906 may be located prior to the switching devices 908/910 (e.g., the switching devices 156 and 166 shown in FIGS. 3 and 4) and may be configured to detect the current being provided to the switching devices 908/910, which is then provided to the permanent coils 914 and/or the bypass coils 912. The current transformer 906 may provide the detected current to the control circuitry 804 and/or the controller 806. Furthermore, the controller 806 may be configured to control the first and second switching devices 908 and/or 910 such as by opening or closing the first and second switching devices 908 and/or 910 so as to place the motor 808 in the tapped position or the primary position.

In some variations, each phase of the three-phase motor (e.g., phases 902-904) may also include a circuit breaker. The circuit breaker is configured to protect the electrical circuit from damage caused by overcurrent or short circuit. In some instances, the circuit breaker may be a 150 Amp (A) circuit breaker. In some variations, the switching devices 908 and 910 may be 150 A contactors. In some examples, the CTs 906 may be 1000:5 CTs. In some instances, the motor 808 may be a tapped 50 horsepower (hp) synchronous motor. In some variations, as mentioned above, the current transformer 906, the first switching device 908, and the second switching device 910 may be external to the motor 808 (e.g., outside the housing of the motor 808).

Figure 10A:
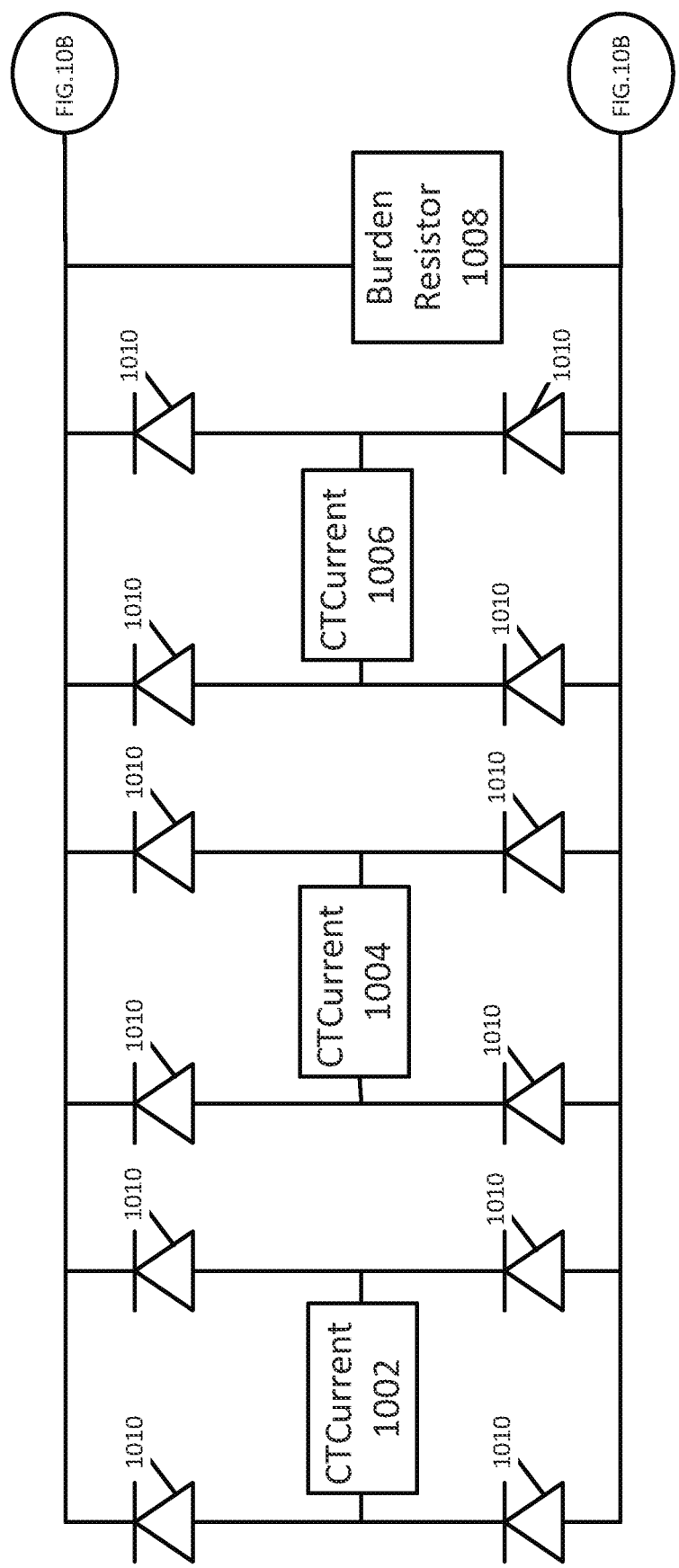
FIGS. 10A and 10B show an exemplary control circuitry for controlling switching devices in accordance with the disclosure.
Figure 10B:
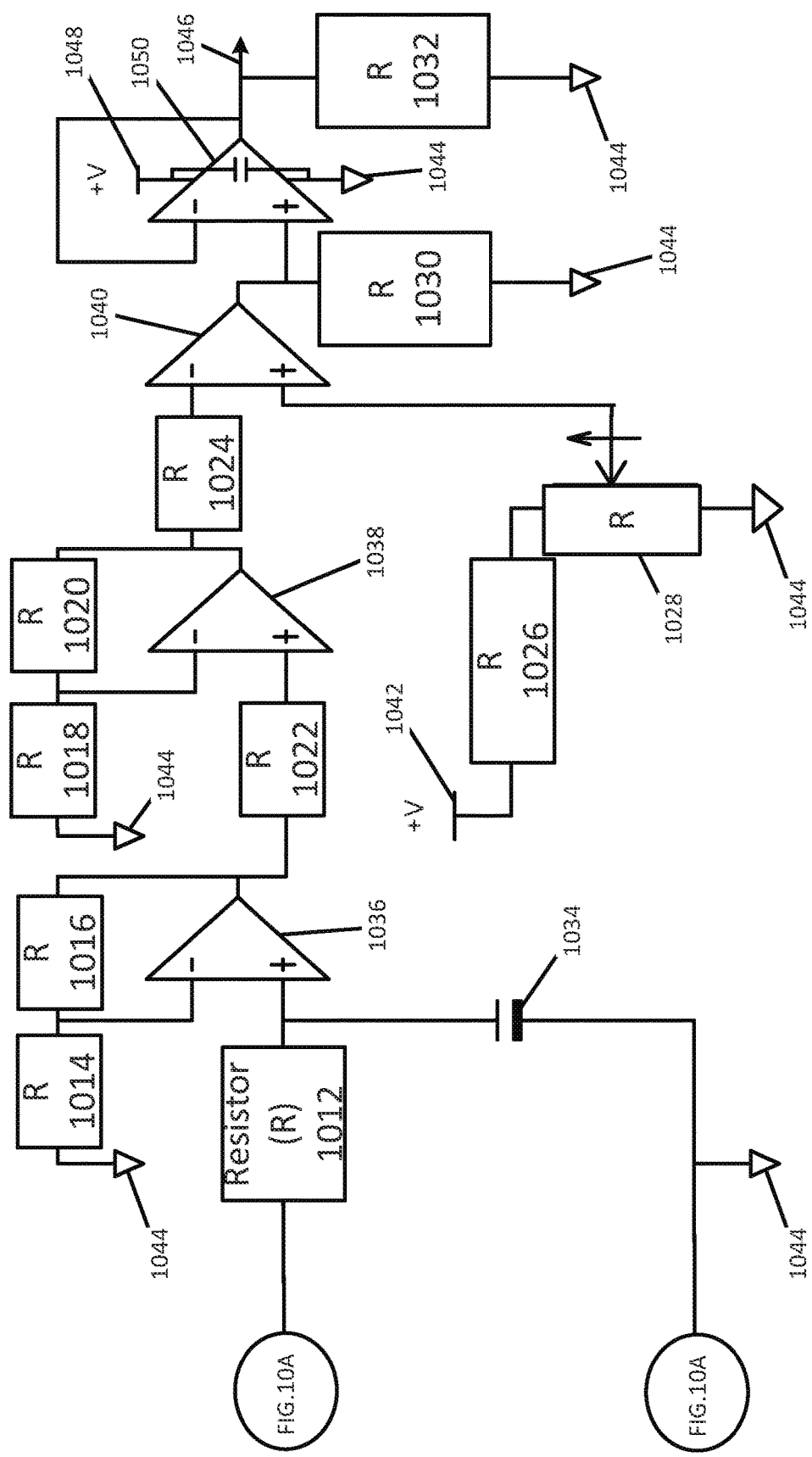

FIGS. 10A and 10B show exemplary control circuitry (e.g., control circuitry 804) for controlling the switching devices (e.g., the switching devices 816) in accordance with the disclosure. For example, FIGS. 10A and 10B show control circuitry 1000 that provides a transition pulse 1046 (shown on FIG. 10B) to the controller (e.g., the controller 806) based on the current from the CTs (e.g., the CTs 906).

Referring to FIGS. 9 and 10A, the CTs 906 provide the detected current to the control circuitry 1000. Additionally, and/or alternatively, the CTs 906 may adjust (e.g., multiply or reduce) the detected current prior to providing the current to the control circuitry 1000. The CT currents 1002-1006 are the currents from the CTs 906. For instance, the CT current 1002 may be the current from the CT 906 for the first phase 902 of the motor 808, the CT current 1004 may be the current from the CT 906 for the second phase 903, and the CT current 1006 may be the current from the CT 906 for the third phase 904. For example, the CT currents 1002-1006 may be electrical wires that connect the CTs 906 from within the motor 808 to the control circuitry 1000. In some instances, the CTs 906 may be part of the control circuitry 1000. In such instances, the CT currents 1002-1006 may be the CTs 906.

The diodes 1010 are diode bridges that are configured to rectify (e.g., full-wave rectify) the current signals from the CT currents 1002-1006. Additionally, and/or alternatively, the diodes 1010 may sum up the currents together (e.g., sum the CT currents 1002-1006 for all three-phases into a single current signal).

The burden resistor 1008 is configured to obtain the rectified and summed current from the diodes 1010, and change the rectified and summed current into a voltage. For instance, the summed and rectified current may be fairly high, and may potentially damage the overall current (e.g., burn out the resistors and so on). As such, the burden resistor 1008 changes the current to a voltage. In some instances, the burden resistor 1008 may be 0.1 ohm.

Referring to FIG. 10B, the resistor (R) 1012 and the capacitor 1034 are configured to perform filtering of the voltage signal from the actual current (e.g., the voltage signal from the burden resistor 1008 of FIG. 10A). For instance, the resistor 1012 and the capacitor 1034 may filter a small amount out of the voltage signal from the burden resistor 1008. In some instances, the capacitor 1034 is a 1 micro Farad capacitor and the resistor 1012 is a 10,000 ohm resistor.

The circuit element 1036 is an amplifier and configured to amplify the voltage signal from the resistor 1012/the capacitor 1034 and buffer the voltage signal. The resistors 1014, 1016, and 1022 are used along with the amplifier 1036 to amplify, buffer, and/or filter the voltage signal. In some instances, the resistor 1014 is a 10,000 ohm resistor, the resistor 1016 is a 100,000 ohm resistor, and the resistor 1022 is a 10,000 ohm resistor.

The circuit element 1038 is an amplifier and configured to amplify the voltage signal from the resistor 1022 and buffer the voltage signal. The resistors 1018, 1020, and 1024 are used along with the amplifier 1038 to amplify, buffer, and/or filter the voltage signal. In some instances, the resistor 1018 is a 10,000 ohm resistor, the resistor 1020 is a 20,000 ohm resistor, and the resistor 1024 is a 10,000 ohm resistor.

The circuit element 1040 is an amplifier (e.g., a comparator) and configured to compare the voltage signal from the resistor 1024 (e.g., the voltage signal that is associated with the CTs 906) with a voltage source (e.g., the voltage source 1042). Based on the comparison, the circuit element 1040 provides a high signal (e.g., a transition pulse) or low signal (e.g., no transition pulse) onward. For example, as shown, on the negative side of the comparator 1040 is an input signal (e.g., a voltage signal) that is connected to the CTs 906 (e.g., via the CT currents 1002-1006, the burden resistor 1008, and other circuit elements shown in FIGS. 10A and 10B). On the positive side, the input signal is from a voltage source 1042 as well as resistors 1026 and 1028. The resistors 1026 and 1028 may be a potentiometer and may be configured to determine the current level at which the transfer pulses (e.g., the transfer pulse 1406 shown in FIG. 14B) appear with respect to the feedback current signal (e.g., the current signal 1402 shown in FIG. 14B). For instance, the arrow on the right hand side pointing into the middle of resistor 1028 may be the wiper of the potentiometer and the upward pointing arrow to the right of the wiper indicates the direction the wiper moves when the shaft of the potentiometer is turned clockwise. This adjusts the voltage into the circuit element 1040, which determines the level at which the transfer pulses appear with respect to the current signal. In some variations, the resistor 1026 is a 20,000 ohm resistor and the resistor 1028 is a 10,000 ohm resistor.

Based on comparing the two inputs (e.g., the input that is connected to the CTs 906 and the input that is connected to the voltage source 1042), the comparator provides a signal (e.g., an analog and/or a digital signal). The signal indicates whether a transition pulse is provided to the controller 806. In some examples, the resistors 1026 and 1028 may be optional, and the voltage source 1042 may be connected directly to an input of the comparator 1040. In some variations, the voltage source 1042 may be pre-defined and/or user-defined. For example, the controller 806 may control the voltage source 1042 by setting a voltage value (e.g., 3.5 V) for the voltage source 1042. In some examples, during commissioning, the controller 806 may set the voltage source 1042 to a certain value based on the motor 808. For example, based on the motor 808 and/or the load coupled to the motor 808, the controller 806 may set the voltage source 1042 to a certain value.

The resistors 1030 and 1032 are pull-down resistors that are configured to pull down the voltage from the circuit elements 1040 and 1050. The voltage source 1048 is a voltage source that provides voltage to the amplifier 1050. The amplifier 1050 may be an operational amplifier and configured to act as a buffer for the signal out of the circuit element 1040. The amplifier 1050 may include a capacitor that is connected across the voltage source 1048. The capacitor may be a decoupling capacitor and used to keep the amplifier 1050 operating in a stable manner. In some instances, the resistor 1030 is a 10,000 ohm resistor and the resistor 1032 is a 1,000 ohm resistor. In some examples, the amplifier 1050 and/or the resistor 1030 may be optional (e.g., the amplifier 1050 may be removed from the circuit 1000 and the output from the circuit element 1040 is the transition pulse 1046). In some variations, the amplifier 1050 may be replaced by comparator type circuit elements that include a pull-up resistor and/or a pull-down resistor.

As such, based on the control circuitry 1000, a transition pulse 1046 may be provided to the controller 806. Based on the transition pulse 1046, the controller 806 may provide command signals to the switching devices 908 and/or 910 to open/close. This will be described in further detail below.

The control circuitry 1000 further includes a plurality of ground connections 1044 throughout the circuit.

In some instances, the resistor 1030, the resistor 1032, the voltage source 1048, and the amplifier 1050 may be replaced by a diode and a load resistor. The diode is connected to the output of the comparator 1040 and configured to provide a pulse (e.g., a transition pulse) based on the output of the comparator 1040 reaching a certain threshold. The load resistor may pull down the output of the comparator 1040 such that there is no signal going to the diode unless the comparator 1040 reaches a certain threshold.

In some examples, the control circuitry 1000 may exclude circuit elements and/or include additional circuit elements such that the transition pulse 1046 to the controller 806 may be a digital input or an analog input. For example, the transition pulse 1046 may be a digital input. Based on the digital input, the controller 806 may control the switching devices 908 and/or 910. For instance, the controller 806 may provide the control command to close/open the switching devices 908/910 based on the digital input being high (e.g., "1") and may take no action based on the digital input being low (e.g., "0"). In some variations, the transition pulse 1046 may be an analog input. For instance, based on the analog input being between −3 to 5 V, the controller 806 may take no action. Based on the analog input being between 15 to 30 V, the controller 806 may provide the control command.

Figure 11:
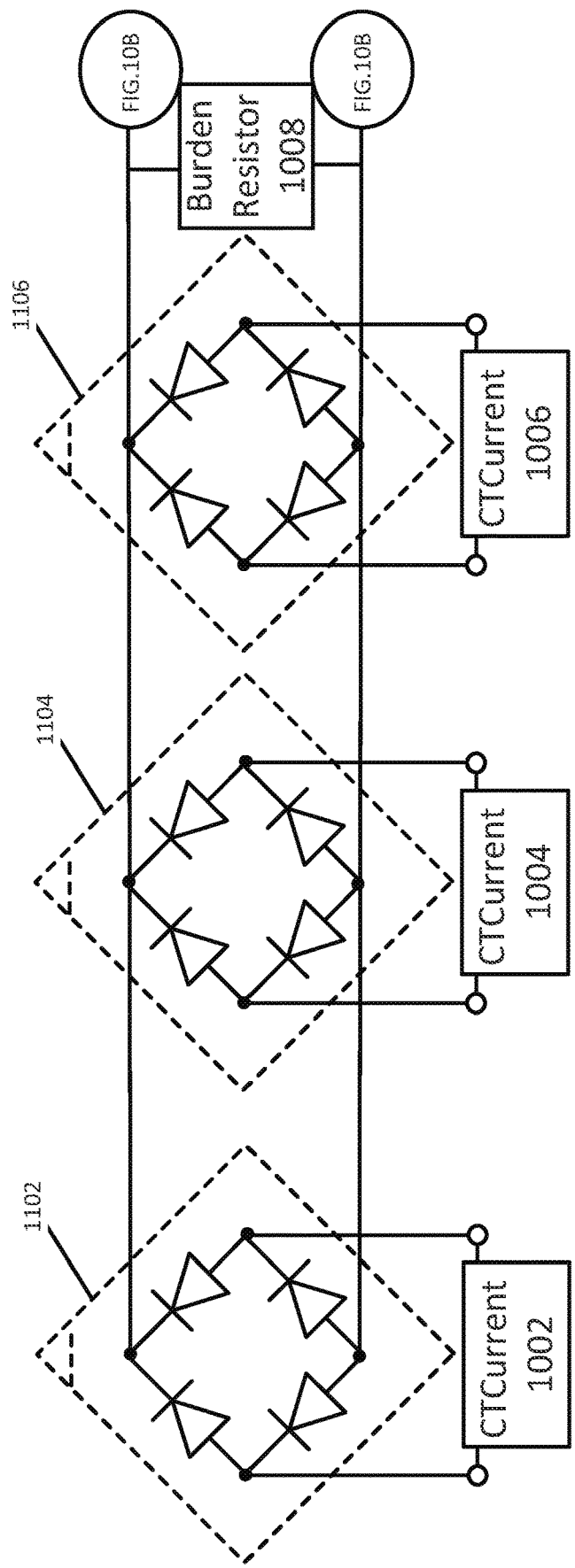
FIG. 11 shows another exemplary control circuitry for controlling the switching devices in accordance with the disclosure.

FIG. 11 shows another exemplary control circuitry (e.g., control circuitry 804) for controlling the switching devices (e.g., the switching devices 816) in accordance with the disclosure. For instance, FIG. 11 shows an alternative embodiment for the control circuitry 1000 shown in FIG. 10A. For example, referring to FIG. 10A, the diodes 1010 are used to rectify and sum the currents from the CT currents 1006. Referring to FIG. 11, the diodes 1010 are replaced by three rectifiers 1102-1106—one for each CT current 1002-1006. The rectifiers 1102-1106 are shown as four diodes. The burden resistor 1008 is also shown and is described above in FIG. 10A. In particular, FIG. 11 shows the CT secondary connections to diode bridge rectifiers (e.g., rectifiers 1102-1106) and the burden resistor 1008. The rectifiers 1102-1106 and the burden resistor 1008 may be mounted onto a piece of aluminum sheet. In some instances, the wattage rating for the burden resistor 1008 may be 25 watts (W), and may be dissipating 0.2 W. In other words, as opposed to individual diode devices (e.g., the diodes 1010), FIG. 11 shows four diodes within diode rectifiers 1102, 1104, and 1006 (e.g., diode rectifier modules). For example, the diode modules 1102, 1104, and 1106 include the diodes 1010. In some instances, the burden resistor 1008 may be replaced by a programmable logic controller (PLC). For instance, a current-to-voltage conversion device (e.g., a PLC or a burden resistor) may sum the currents from the rectifiers 1002-1006 and convert the summed current into a voltage signal that is fed to the filters/amplifiers of FIG. 10B.

In some examples, the burden resistor 1008 may be changed to using two resistors (e.g., 0.1 ohm resistors) in series. The output voltage may be similar to the primary current in such examples.

In some instances, one or more elements of the control circuitry 1000 and/or 1100, including the entire control circuitry 1000 and/or 1100, may be implemented as hardware circuit elements. In other instances, one or more elements of the control circuitry 1000 and/or 1100 may be implemented as software elements (e.g., instructions stored in a non-transitory computer readable medium).

FIG. 12 depicts an exemplary process 1200 for controlling the switching devices in accordance with the disclosure. The process 1200 may be performed by the controller 806 shown in FIG. 8. However, it will be recognized that any of the following blocks may be performed in any suitable order and that the process 1200 may be performed by any suitable controller for any suitable motor with a plurality of bypass coils and a plurality permanent coils. FIGS. 8 and 9 will be used to describe process 1200. In particular, FIG. 9 shows one phase of components of the motor 808 (e.g., a first phase 902) whereas FIG. 8 shows the components for all three phases (e.g., the bypass coils 810 may include the bypass coils 912 for the first, second, and third phase 902-904).

At block 1202, the controller 806 receives a start command for starting a synchronous electric motor 808. The synchronous electric motor 808 comprises one or more switching devices 816 that selectively switches between a tapped position and a primary position. The tapped position electrically communicates power to only a plurality of permanent coils 812 (e.g., the permanent coils 914 for first, second, and third phases 902-904 shown in FIG. 9). The primary position electrically communicates power to the plurality of permanent coils 812 and a plurality of bypass coils 810 (e.g., the bypass coils 912 for first, second, and third phases 902-904 shown in FIG. 9).

Figure 3:
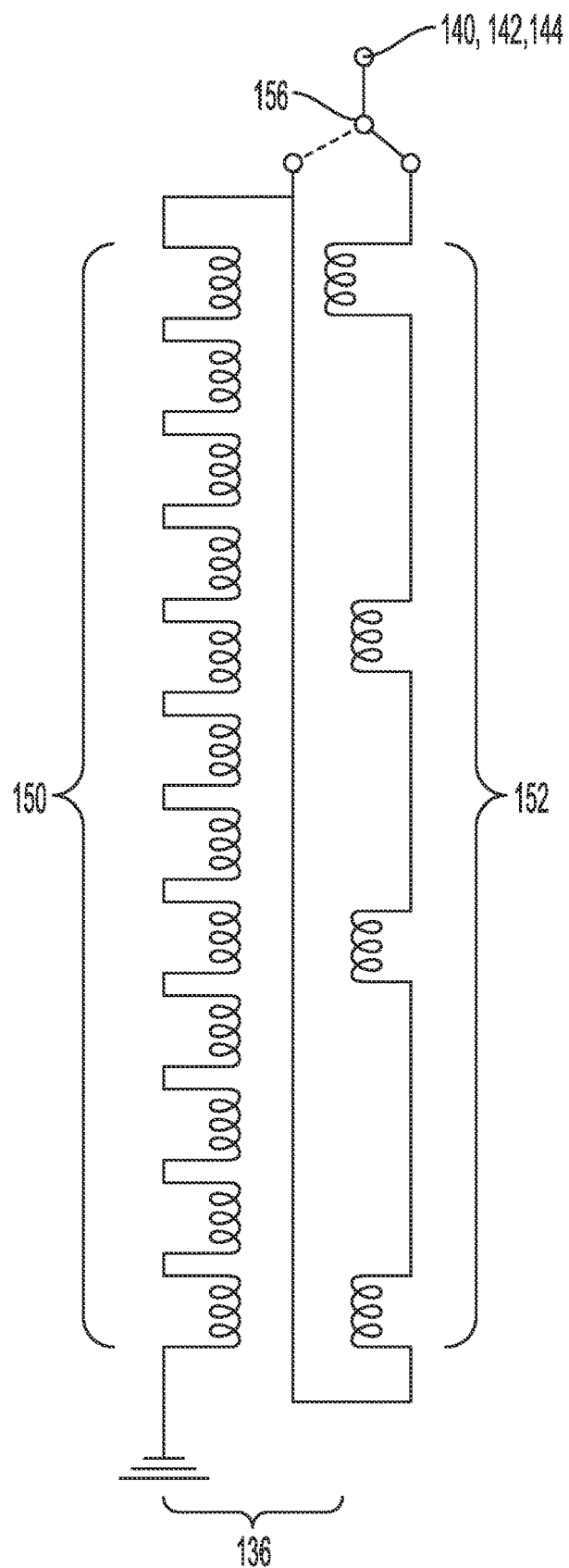
FIG. 3 is a schematic representation of a selectively reconfigurable arrangement of coils in a phase to alternatively produce a high flux state and a rated flux state in accordance with the disclosure.

For example, as shown in FIGS. 3, 4, and 9 above, the permanent coils 150/914 may be in series with the bypass coils 152/912, and both permanent and bypass coils 150/914 and 152/912 may be in series with a switching device (e.g., switching device 156, 166, 908, 910). Referring to FIG. 9, in a tapped position, the first switching device 908 may be open and the second switching device 910 may be closed such that electrical power is provided only to the permanent coils 914. In a primary position, the first switching device 908 may be closed and the second switching device 910 may be open such that electrical power is provided to both the permanent coils 914 and the bypass coils 912.

Initially, both the switching devices 908 and 910 may be open. After receiving the start command at block 1202, the controller 806 may provide instructions to start the motor 808. The instructions may include a switching command (e.g., an initial switching command) to switch into a primary position. In other words, the controller 806 may provide instructions to close the first switching device 908 and open the second switching device 910 such that electrical power is provided to both the bypass coils 912 and the permanent coils 914.

At block 1204, the controller 806 provides a first switching command to the one or more switching devices 816 to switch to the tapped position based on obtaining a transition signal from a control circuitry 804. The control circuitry 804 comprises a comparator that compares an electrical characteristic (e.g., a voltage or current value) associated with one or more input currents to the one or more switching devices with a threshold value.

For example, the control circuitry 804 may obtain current values from the current transformer 906, and provide a transition signal based on the obtained current values. The control circuitry 804 may include a comparator (e.g., the comparator 1040 shown on FIG. 10B) that compares a voltage or current value associated with the obtained current values with a threshold value (e.g., 3.5 V). Based on the comparison, the control circuitry 804 may provide a transition signal to the controller 806. The control circuitry 804 may include the comparator 1040 shown on FIG. 10B as well as one or more additional circuit elements from the control circuitry 1000 and/or 1100.

For instance, referring to FIGS. 10A and 10B, an exemplary control circuitry 1000 is shown with a comparator 1040 (e.g., an amplifier). The control circuitry 1000 obtains current values from the current transformer 906 (e.g., the CT currents 1002-1006) and adjusts the current values (e.g., sums/filters) the current values using the diodes 1010. The control circuitry 1000 may further include a burden resistor 1008 to convert the summed/filtered current signal to a voltage value/signal. The control circuitry 1000 may further amplify, filter, and/or buffer the voltage signal. The control circuitry 1000 may then include a comparator 1040 that compares the voltage signal with a voltage threshold value. The voltage threshold value may be directly from a voltage source 1042. Based on the comparison, the control circuitry 1000 provides a transition pulse 1046 (e.g., a transition signal) to the controller 806.

Referring back to FIGS. 8 and 9, based on receiving the transition signal, the controller 806 generates and provides a first switching command to the switching devices 816 to switch the motor 808 into a tapped position. For example, in the tapped position, the controller 806 provides a command to open the first switching device 908 and close the second switching device 910 such that electrical power is provided to only the permanent coils 914.

In some instances, the controller 806 provides the first switching command based on obtaining a transition signal and a first time interval (e.g., a first time interval associated with a timer). For example, the first time interval may be a pre-set and/or user-defined interval such as two seconds, and may start when the motor 808 starts up (e.g., after the controller 806 receives a start command at block 1202). The controller 806 may receive a transition signal, but the first time interval (e.g., two seconds) might not have elapsed (e.g., within the two seconds). As such, the controller 806 might not provide the first switching command. Based on obtaining a transition signal after the first time interval elapsing, the controller 806 may provide the first switching command. In other words, the controller 806 might not provide the first switching command until after the first time interval has elapsed. The controller 806 may use an internal timer or an external timer device for determining whether the first time interval elapses.

At block 1206, subsequent to providing the first switching command, the controller 806 provides a second switching command to the one or more switching devices to switch to the primary position from the tapped position. For example, the controller 806 provides a command to close the first switching device 908 and open the second switching device 910 such that electrical power is provided to the permanent coils 914 and the bypass coils 912.

In some examples, the controller 806 may use one or more additional time intervals (e.g., a second time interval and a third time interval) to determine whether to provide the second switching command. For example, a delay may occur when opening a switching device and/or when closing a switching device. For example, the second switching device 910 may be a contactor that takes a set amount of time to close and the first switching device 908 may also take a set amount of time to open. As such, the controller 806 may provide a delay (e.g., a second time interval) so as to ensure the switching devices 908 and 910 open/close properly. Accordingly, the second time interval may be an amount of time between opening the first switching device 908 and closing the second switching device 910.

Additionally, and/or alternatively, the controller 806 may use a third time interval to determine whether to provide the second switching command. The third time interval may be a pre-defined and/or user-defined amount of time to keep the second switching device 910 closed. The controller 806 may provide the second switching command based on the second and/or third timer intervals elapsing. The controller 806 may use one or more internal timers or one or more external timer devices for determining whether the second/third time intervals elapse. In some instances, the second time interval may be a fixed, adjustable, and/or determined by the controller 806. The second time interval may be used to determine how long to wait after opening the first switch 908 until the controller 806 commands the second switch 910 to close. The third time interval may also be fixed, adjustable, and/or determined by the controller 806. The third timer interval may be used to determine how long to wait after the second switch 910 was commanded to close until the controller 806 commands the second switch 910 to open. After the second switch 910 opens, the controller 806 commands re-closing of the first switch 908. In some examples, the first time interval may be fixed, adjustable, and/or determined by the controller 806. The first time interval may be used to determine when to start looking at the transition pulses. Based on the transition pulses, the controller 806 may command the first switch 908 to open.

In some variations, the switching commands may be either a high signal (e.g., a digital "1") or a low signal (e.g., a digital "0"). As such, in the tapped position (e.g., the first switching command), the controller 806 may provide a high signal to the second switching device 910 and a low signal to the first switching device 908. Similarly, in the primary position (e.g., the second switching command), the controller 806 may provide a high signal to the first switching device 908 and a low signal to the second switching device 910.

FIG. 13 shows a timing chart in accordance with the disclosure and will be used to describe process 1200 in more detail. For example, the timing chart 1300 includes a start command signal 1302, a stop command signal 1304, a transition pulse signal 1306, a close command for the first switching device (e.g., first switching device 908) signal 1308, and a close command for the second switching device (e.g., the second switching device 910) signal 1310. The timing chart also includes events 1312-1338 associated with particular instances in time.

For example, at event 1312, the signals 1302, 1306, 1308 and 1310 are low as the motor 808 is stopped. At event 1314, a rising edge of the start command signal 1302 is obtained by the controller 806 (e.g., block 1202 described above). Additionally, a first timer T1 starts that counts up to a first time interval, which is shown as 1240. As mentioned above, the first time interval may be two seconds. Furthermore, the controller 808 provides a close command to the first switching device, which is indicated by a rising edge of the close command for the first switching device signal 1308.

At event 1316, the first switching device 908 actually closes (e.g., there is a delay between providing the close command signal and the switching device 908 actually closing). At event 1318, the timer T1 times out (e.g., two seconds has elapsed). For example, as shown by the transition pulse signal 1306, there are three rising edges within the first time interval 1240. However, the close command for the first switching device signal 1308 remains high whereas the close command for the second switching device signal 1310 remains low. As such, as mentioned above, prior to the first time interval 1240 elapsing (e.g., between events 1314 and 1318), the controller 808 might not provide the first switching command to close the second switching device 910 and open the first switching device 908.

At event 1320 (e.g., block 1204), the control circuitry 804 provides another transition pulse, which is shown by the rising edge of the transition pulses signal 1306. At this time, a second timer starts, which lasts for a second time interval 1242. Furthermore, the close command for the first switching device signal 1308 goes low (e.g., the controller ceases to provide a high signal for keeping the first switching device 908 closed such that the first switching device 908 opens). At event 1322, the first switching device 908 actually opens due to a delay between stopping to provide the command and the device 908 actually opening.

At event 1324, the second timer times out (e.g., the second time interval 1242 elapses) and the controller 806 provides a high signal for closing the second switching device 910. This is shown by the rising edge of the second switching device signal 1310. Furthermore, a third timer starts, which lasts for a third time interval 1244. At event 1326, the second switching device 910 actually closes due to the delay.

At event 1328 (e.g., block 1206), the third timer times out (e.g., the third time interval 1244 elapses). Based on the third timer timing out, the controller 806 provides the second switching command, which causes the close command for the second switching device signal 1310 to go low to open the second switching device 910, and the close command for the first switching device signal 1308 to go high to close the first switching device 908.

At event 1330, the second switching device 910 actually opens. At event 1332, the first switching device 908 actually closes. There may be additional interlocking between the first switching device 908 and the second switching device 910 so that there is not a time when both are closed at the same time. At event 1334, a falling edge of the stop command signal 1304 is detected by the controller 806. Based on the detection, the controller 806 causes the close command for the first switching device signal 1308 to go low, which causes the first switching device 908 to open so both devices 908 and 910 are open. At event 1336, the first switching device 908 actually opens. At event 1338, the process moves back to event 1312 to await a start command signal 1302.

In some variations, the switching devices 908 and 910 are electronic switches and as such "closes" may indicate turn on and "opens" may indicate to turn off. In some instances, the switching devices 908 and 910 are contactors that open and close.

In some instances, the controller 806 may further obtain feedback for when the first and second switching devices 908 910 are open or closed. In some instances, the controller 806 may provide instructions to turn on or off start and stop light emitting diodes (LEDs) to indicate whether the motor 808 has started or stopped or at some other operating state.

In some examples, the controller 806 may obtain one or more analog inputs and/or one or more digital inputs. Further, the controller 806 may provide one or more analog or digital outputs. For example, the controller 806 may obtain digital inputs such as a start command, a stop command, and/or a transition pulse, which are described above. Furthermore, the controller 806 may obtain analog inputs such as a first time associated with the first timer, a second time associated with a second timer, and a third time associated with a third timer. Also, the controller 806 may provide digital outputs such as closing the first or second switching devices 908/910 as well as turning on the start LED or the stop LED. Additionally, and/or alternatively, additional circuitry may be used to ensure that the both the first and second switching devices 908 and 910 are not closed at the same time. For instance, the control system 802 may include one or more circuit elements such as contactors to ensure that the first switching device 908 is closed only if the second switching device 910 is open. Similarly, the control system 802 may include one or more circuit elements such as contactors to ensure that the second switching device 910 may close only if the first switching device 908 is open. In some variations, the first and second switching devices 908 and 910 may be powered by a 120 V.

In some examples, the present disclosure provides a method that learns the particular characteristics of a motor 808—for example, whether it is loaded or unloaded, whether it has reached its steady-state point of operation, and so on—and modify the timing of the transition. For instance, during commissioning, an operator (e.g., an engineer) may determine the values for the first, second, and/or third timer intervals. The controller 806 may receive user input indicating values and set the timer intervals to these values. Additionally, and/or alternatively, the controller 806 may be configured to monitor the current feedback signal directly across the burden resistor 1008 or after an amplifier (e.g., amplifiers 1036, 1038, and/or 1040), and from the waveshape of the current signal, determine when to perform the transition from the first switching device 908, to the second switching device 910, and then back to the first switching device 908.

Figure 14B:
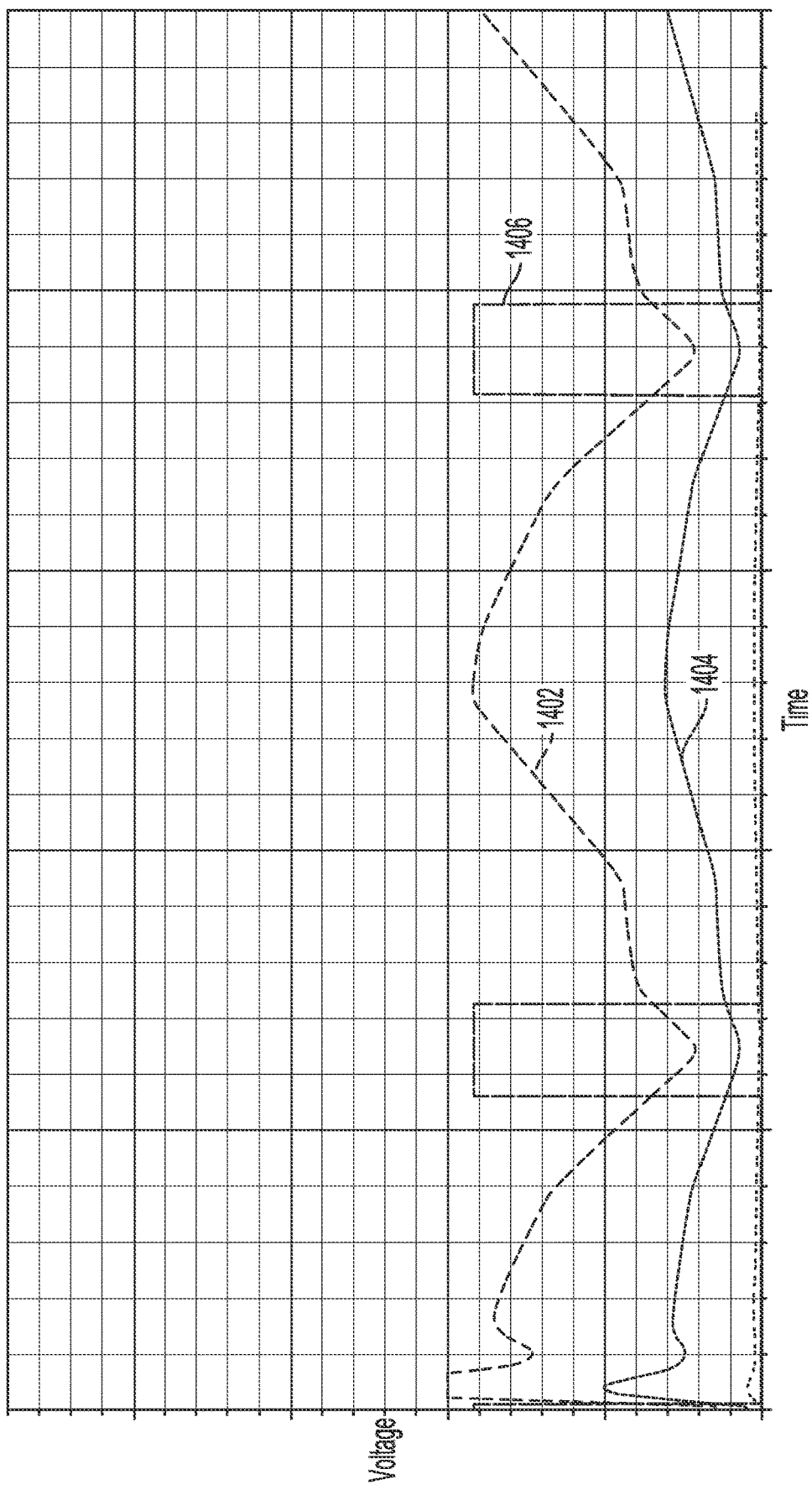

FIGS. 14A and 14B show graphical representation of signals from the control system and the motor in accordance with the disclosure. For instance, FIG. 14A shows a graphical representation 1400 of the current (Amps) over a period of time (zero to ten seconds) for a motor such as motor 808 and/or 100. FIG. 14B shows a graphical representation 1401 of the measured voltage over a period of time for the control circuitry 1000. For instance, line 1402 shows the voltage representation of a current signal measured after the circuit element 1036 (e.g., the amplifier 1036). Line 1404 shows the voltage measured after the circuit element 1038 (e.g., the amplifier 1038). Line 1406 is a transition pulse signal and shows the voltage measured after the circuit element 1040 (e.g., the comparator 1040). Line 1402 is a root mean square (RMS) voltage representation of the RMS current signal seen in FIG. 14A.

Figure 15:
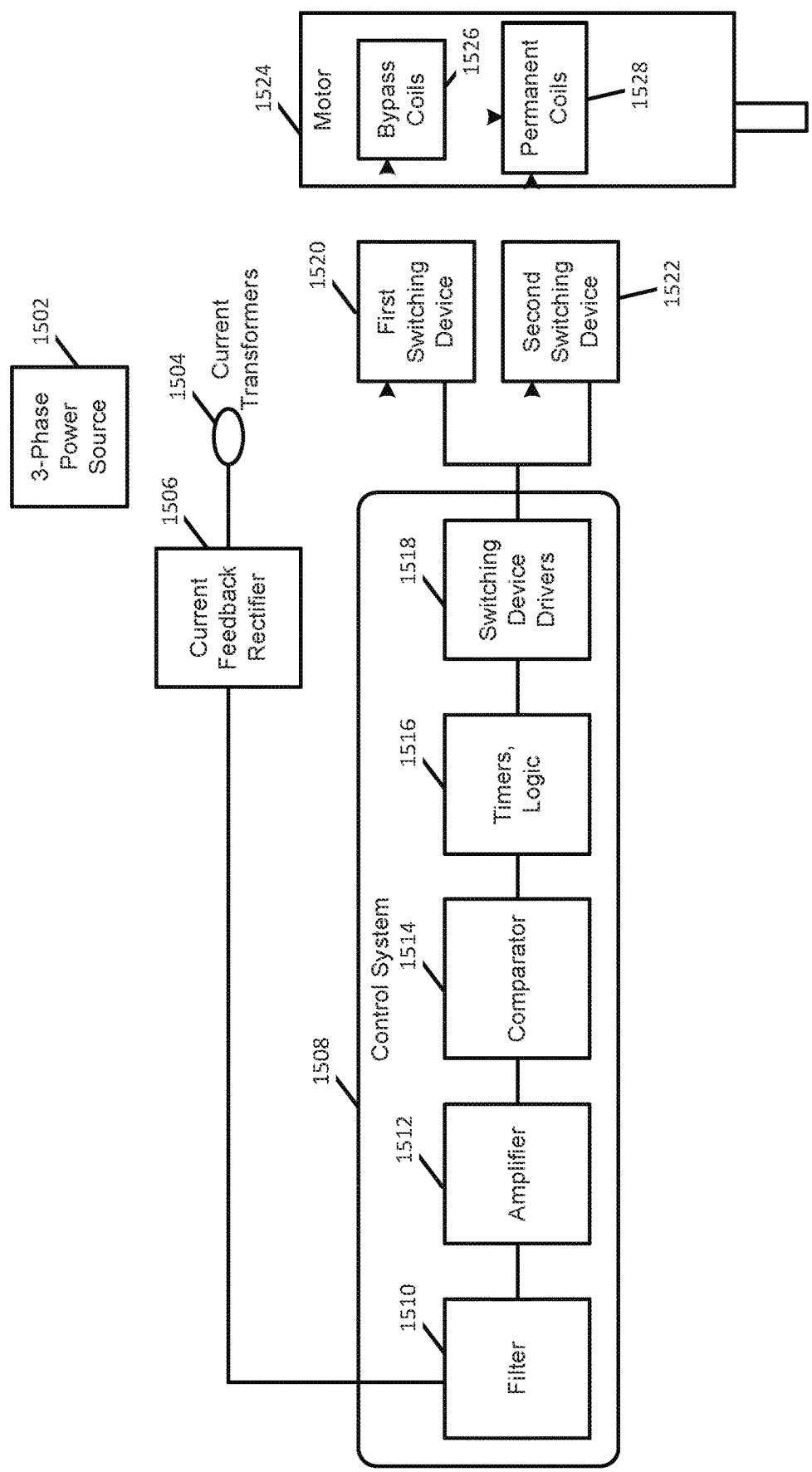
FIG. 15 is a schematic illustration of a block diagram depicting an exemplary control scheme for controlling a synchronous electric motor in accordance with the disclosure.

FIG. 15 is a schematic illustration of a block diagram 1500 depicting an exemplary control scheme for controlling a synchronous electric motor in accordance with the disclosure. For instance, a 3-phase power source 1502 may be configured to provide 3 phase power to the motor 1524. The current transformers 1504 may be the current transformers 814 and/or 906 described above in FIGS. 8 and 9. The current transformers 1504 may provide currents (e.g., currents 1002, 1004, and 1006 from FIG. 10A) to a current feedback rectifier 1506. The current feedback rectifier 1506 may be the circuit 1000 shown in FIG. 10A and/or the circuit 1100 shown in FIG. 11, which includes the burden resistor 1008. The control system 1508 may be the control system 802. The control system 1508 may include the filter 1510, amplifier 1512, comparator 1514, timers/logic 1516, and switching device drivers 1518, which are described above, for example, in FIG. 10B and FIG. 12. The first switching device 1520 may be the first switching device 908 described in FIG. 9. The second switching device 1522 may be the first switching device 910 described in FIG. 9. The motor 1524 may be the motor 808 described in FIG. 8. The bypass coils 1526 may be the bypass coils 810 and 912 described in FIGS. 8 and 9. The permanent coils 1528 may be the permanent coils 812 and 914 described in FIGS. 8 and 9. The dotted lines (e.g., the dotted line from the 3-phase power source 1502 to the first/second switching devices 1520 and 1522) may be denoted the power from the 3-phase power source 1502. The straight lines (e.g., the line from the 1504 to the current feedback rectifier 1506) may be current signals that are used to control the first and second switching device 1520 and 1522.

Figure 16:
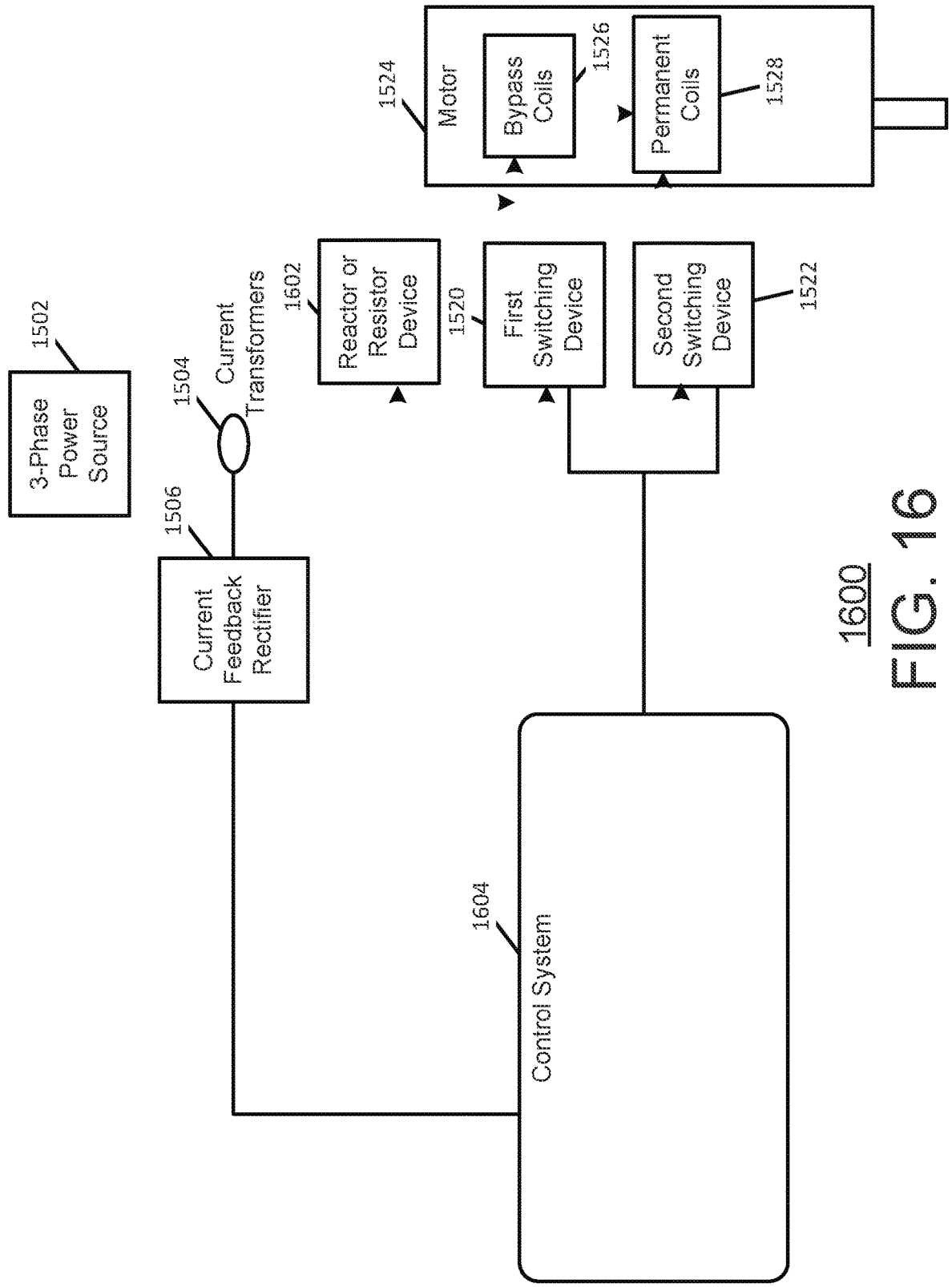
FIG. 16 is a schematic illustration of another block diagram depicting an exemplary control scheme for controlling a synchronous electric motor in accordance with the disclosure.

FIG. 16 is a schematic illustration of another block diagram depicting an exemplary control scheme for controlling a synchronous electric motor in accordance with the disclosure. In particular, FIG. 16 shows the block diagram 1500 of FIG. 15 except with a reactor or resistor device 1602. Additionally, the control system 1604 may include the same and/or additional/alternative components to the control system 1508 of FIG. 15. For instance, in some examples, the control system 1604 may include the filter 1510, the amplifier 1512, the comparator 1514, the timers, logic 1516, and the switching device drivers 1518 of FIG. 15.

The reactor or resistor device 1602 may be an impedance device (e.g., one or more reactors, inductors, and/or a resistors). The reactor or resistance device 1602 may be in parallel to the first switching device 1520. For instance, for a 3-phase motor, 1524, each phase of the motor 1524 may include a reactor or resistor device 1602, a first switching device 1520, and a second switching device 1522. The reactor or resistor device 1602 and the first switching device 1520 may be in parallel to each other and connected to the bypass coils 1526. The second switching device 1522 may be connected to the permanent coils 1528. Additionally, and/or alternatively, as mentioned previously, the reactor or resistor device 1602 as well as the first/second switching devices 1520 and 1522 may be included within the motor 1524.

In operation, as mentioned above, there may be delays between when a signal is provided to the first switching device 1520 and/or the second switching device 1522 to open/close and when the first switching device 1520 and/or the second switching device 1522 actually opens/close. When either of the switching devices 1520/1522 are closed, the current from the 3-Phase power source 1502 may pass through them and energize the bypass coils 1526 and/or the permanent coils 1528 (e.g., the second switching device 1522 may energize only the permanent coils 1528 when closed whereas the first switching device 1520 may energize both permanent and bypass coils 1526 and 1528). However, during these delays, both switching devices 1520 and 1522 may be open. As such, referring to FIG. 15 (e.g., an open transition circuit), in some instances, there might not be current flowing through to the motor 1524, including no current energizing either the permanent coils 1528 or the bypass coils 1526. Accordingly, referring to FIG. 16 (e.g., a closed transition circuit), the reactor or resistor device 1602 may be included such that when both switching devices 1520 and 1522 are open, at least some current may be flowing through the motor 1524 including through the bypass coils 1526 and the permanent coils 1528. With this current moving through the motor 1524, the motor 1524 is producing some torque such that the motor 1524 does not slow down as much during times when both switching devices 1520 and 1522 are open. This may cause less mechanical stress on the motor shaft and coupling. Additionally, and/or alternatively, the reactor or resistance device 1602 may cause some current to flow through to the bypass coils 1526 and the permanent coils 1528 when the first switching device 1520 is open, regardless if the second switching device 1522 is open or closed. In such instances, the impact of the reactor or resistance device 1602 when the first and second switching devices 1520 and 1522 being open may be greater than when the first switching device 1520 is open and the second switching device 1522 is closed.

Figure 17A:
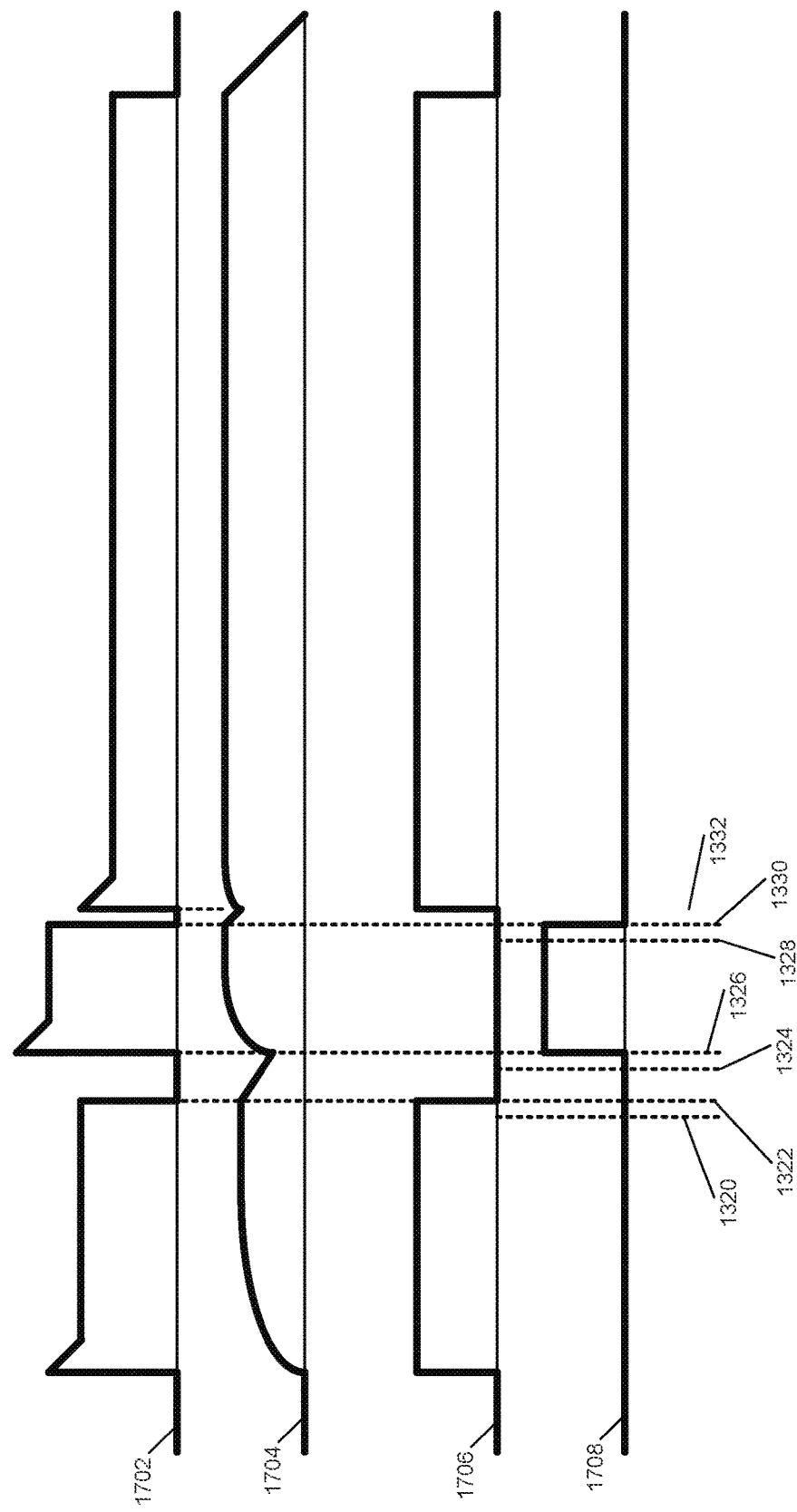
FIGS. 17A and 17B show additional timing charts in accordance with the disclosure.
Figure 17B:
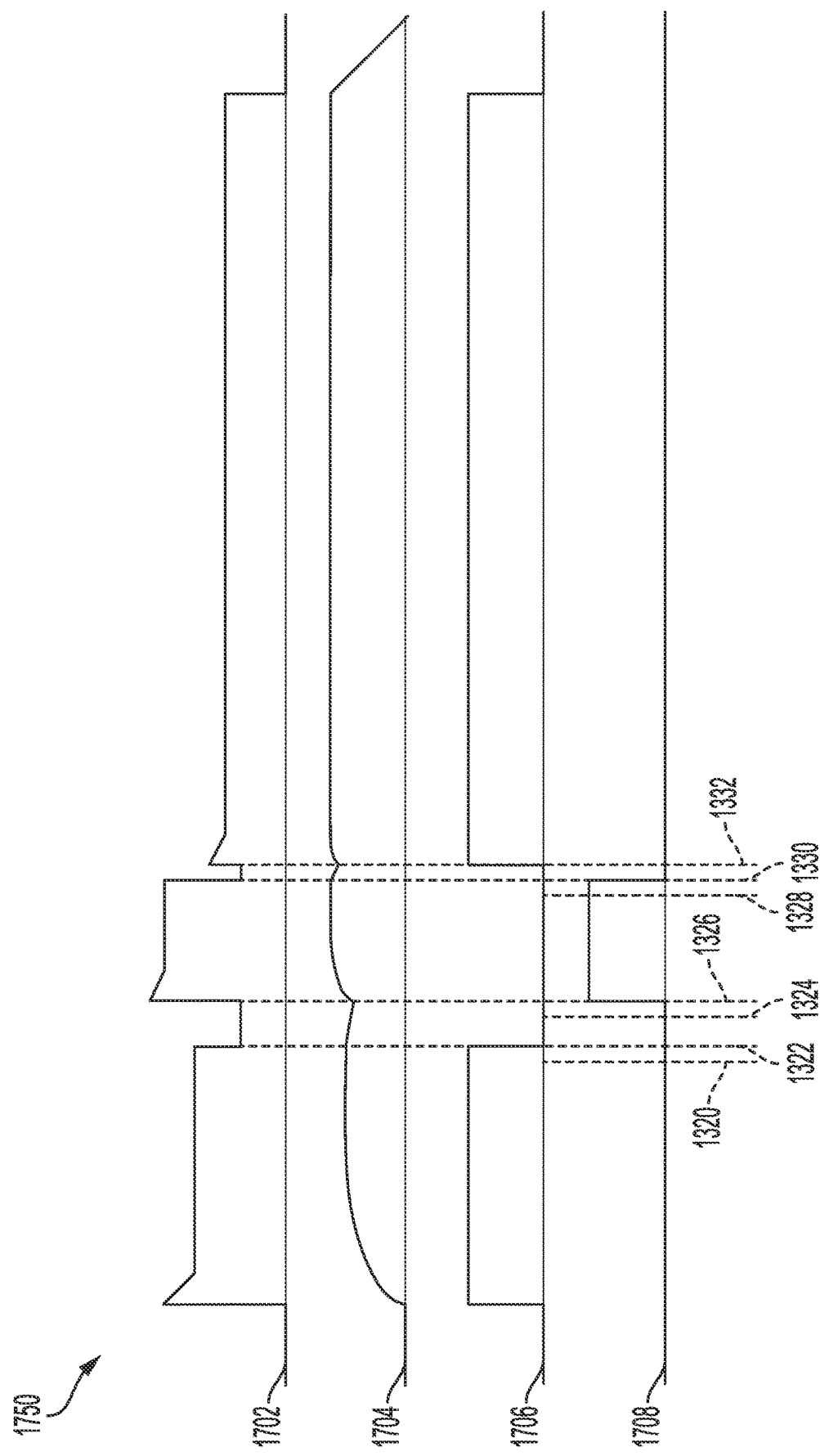

FIGS. 17A and 17B show additional timing charts in accordance with the disclosure and will be used to describe FIGS. 15 and 16 in more detail. For instance, the timing charts 1700 and 1750 include a motor current signal 1702, a motor speed signal 1704, a signal 1706 indicating the position of the first switching device 1520 (e.g., whether the switching device 1520 is open or closed), and a signal 1708 indicating the position of the second switching device 1522 (e.g., whether the switching device 1522 is open or closed).

Referring to FIG. 17A, the timing chart 1700 shows the operation of the open transition circuit (e.g., the block diagram 1500 of FIG. 15 without the reactor or resistor device 1602). For instance, signals 1706 and 1708 may be similar to signals 1308 and 1310 except the signals 1308/1310 show the close commands for the first/second switching devices and signals 1706/1708 show whether the switching devices are actually open or closed. In other words, as mentioned above, there may be a slight delay between the commands to open/close the switching device and the switching devices actually opening/closing. For instance, at event 1320, a transition pulse is provided and the close command for the first switching device signal 1308 goes low. At event 1322, the first switching device actually opens, which is denoted by the signal 1706 going low. At event 1324, a signal is sent to close the second switching device. At event 1326, the second switching device is actually closed, which is denoted by the signal 1708 going high. Therefore, between events 1322 and 1326, both switching devices are open, which causes the motor current, denoted by signal 1702, to go to zero. This also causes a reduction in the motor speed, denoted by signal 1704.

At event 1328, a close command for the first switching device and an open command for the second switching device is sent. At event 1330, the second switching device actually opens, which is denoted by the signal 1708 going low. At event 1332, the first switching device actually closes, which is denoted by the signal 1706 going high. As such, between events 1330 and 1332, both switching devices are again open, which causes the motor current, denoted by signal 1702, to go to zero and a reduction in the motor speed, denoted by signal 1704.

Referring to FIG. 17B, the timing chart 1750 shows the operation of the closed transition circuit (e.g., the block diagram 1600 of FIG. 16 with the reactor or resistor device 1602). As shown by timing chart 1750, when both switching devices are open (e.g., between events 1322 and 1326 as well as events 1330 and 1332), the motor current, denoted by signal 1702, does not reach zero. Additionally, when comparing the motor speed signals 1704 of timing charts 1700 and 1750, there is only a minor reduction in the motor speed with a circuit with the reactor or resistor device 1602 as compared to a circuit without the reactor or resistor device 1602.

In some instances, the amount of motor current desired between the events when both switching devices are open may be based on the value of the reactor or resistor device 1602 (e.g., the resistance and/or inductance of the inductor or resistor).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A system, comprising:
a synchronous three-phase electric motor, comprising:
a rotor;
a stator concentrically disposed about the rotor;
a plurality of coils formed from conductive windings each wound around one or more of a plurality of stator teeth of the stator, wherein the plurality of coils comprises a plurality of permanent coils and a plurality of bypass coils, the plurality of permanent coils comprising a first set of permanent coils for a first phase of the synchronous three-phase electric motor, the plurality of bypass coils comprising a first set of bypass coils for the first phase; and
a plurality of switching devices configured to selectively switch between a tapped position and a primary position, wherein the primary position electrically communicates power to only the plurality of permanent coils, and wherein the tapped position communicates power to both the plurality of permanent coils and the plurality of bypass coils, the plurality of switching devices comprising a first set of switching devices for the first phase, wherein the first set of permanent coils, the first set of bypass coils, and the first set of switching devices are in series with each other, and wherein the first set of switching devices comprises a first electrical contactor and a second electrical contactor; and
a plurality of reactor or resistor devices, wherein a reactor or resistor device, of the plurality of reactor or resistor devices, is in parallel with the first electrical contactor of the first set of switching devices, and wherein the reactor or resistor device is configured to communicate power to the first set of permanent coils and the first set of bypass coils based on the first electrical contactor and the second electrical contactor being in an open state; and
a controller configured to:
provide a first switching command to the plurality of switching devices to switch from the primary position to the tapped position based on a transition signal, wherein the transition signal is based on comparing an electrical characteristic with a threshold value, wherein the electrical characteristic is generated based on using one or more input currents to the plurality of switching devices and using control circuitry.

2. The system of claim 1, wherein the plurality of permanent coils comprise a second set of permanent coils for a second phase of the synchronous three-phase electric motor and a third set of permanent coils for a third phase of the synchronous three-phase electric motor,
wherein the plurality of bypass coils comprise a second set of bypass coils for the second phase and a third set of bypass coils for the third phase, and
wherein the plurality of switching devices comprise a second set of switching devices for the second phase, and a third set of switching devices for the third phase.

3. The system of claim 1, further comprising:
a control system, wherein the control system comprises:
the control circuitry, configured to:
compare the electrical characteristic with the threshold value; and
output the transition signal based on the comparison; and
the controller, wherein the controller is further configured to:
obtain the transition signal from the control circuitry.

4. The system of claim 3, wherein the control system comprises:
a voltage source configured to provide the threshold value; and
a comparator configured to compare the electrical characteristic with the threshold value from the voltage source.

5. The system of claim 4, wherein the one or more input currents comprises a first input current for the first phase, a second input current for a second phase, and a third input current for a third phase, the control system further comprises:
a plurality of current transformers configured to:
detect the first input current, the second input current, and the third input current; and
output the first input current, the second input current, and the third input current.

6. The system of claim 5, wherein the control system further comprises:
a plurality of diodes configured to:
obtain the first input current, the second input current, and the third input current from the plurality of current transformers; and
rectify and sum the first input current, the second input current, and the third input current to generate a total input current, wherein the electrical characteristic is based on the total input current.

7. The system of claim 6, wherein the control system further comprises:
a burden resistor configured to change the total input current into a voltage signal, wherein the electrical characteristic is based on the voltage signal.

8. The system of claim 7, wherein the control system further comprises:
a plurality of amplifiers configured to:
amplify the voltage signal to generate an amplified voltage signal, wherein the electrical characteristic is a voltage value associated with the amplified voltage signal; and
provide the amplified voltage signal to the comparator.

9. The system of claim 5, wherein the control system further comprises a plurality of full-wave bridge configurations,
wherein each of the plurality of full-wave bridge configurations comprises four diodes and configured to rectify the first input current, the second input current, and the third input current from the plurality of current transformers, and
wherein the positive and negative outputs from each of the plurality of full-wave bridge configurations is connected together.

10. The system of claim 9, wherein the control system further comprises:
a current-to-voltage conversion device configured to:
sum the first input current, the second input current, and the third input current into a summed current; and
convert the summed current into a voltage signal.

11. The system of claim 3, wherein the controller is further configured to:
receive a start command for starting the synchronous three-phase electric motor; and
provide an initial switching command to switch to the primary position.

12. The system of claim 11, wherein the controller is further configured to:
start a first timer based on receiving the start command,
wherein the controller is configured to provide the first switching command to the plurality of switching devices based on obtaining the transition signal and the first timer reaching a first time interval.

13. The system of claim 11, wherein the controller is further configured to:
subsequent to providing the first switching command, provide a second switching command to the plurality of switching devices to switch from the tapped position to the primary position.

14. The system of claim 13, wherein the controller is further configured to:
start a second timer based on providing the first switching command,
wherein the controller is configured to provide the second switching command to the plurality of switching devices based on the second timer reaching a second time interval.

15. The system of claim 14, wherein the controller is further configured to:
start a third timer based on the second timer reaching the second time interval,
wherein the controller is configured to provide the second switching command to the plurality of switching devices based on the third timer reaching a third time interval.

16. A system, comprising:
a plurality of switching devices configured to selectively switch between a tapped position and a primary position, wherein the primary position electrically communicates power to only a plurality of permanent coils of a synchronous three-phase electric motor, and wherein the tapped position communicates power to both the plurality of permanent coils and a plurality of bypass coils of the synchronous three-phase electric motor, the plurality of permanent coils comprising a first set of permanent coils for a first phase of the synchronous three-phase electric motor, the plurality of bypass coils comprising a first set of bypass coils for the first phase, the plurality of switching devices comprising a first set of switching devices for the first phase, wherein the first set of permanent coils, the first set of bypass coils, and the first set of switching devices are in series with each other, and wherein the first set of switching devices comprises a first electrical contactor and a second electrical contactor;

the synchronous three-phase electric motor, comprising:
a rotor;
a stator concentrically disposed about the rotor; and
a plurality of coils formed from conductive windings each wound around one or more of a plurality of stator teeth of the stator, wherein the plurality of coils comprises the plurality of permanent coils and the plurality of bypass coils; and
a plurality of reactor or resistor devices, wherein a reactor or resistor device, of the plurality of reactor or resistor devices, is in parallel with the first electrical contactor of the first set of switching devices, and wherein the reactor or resistor device is configured to communicate power to the first set of permanent coils and the first set of bypass coils based on the first electrical contactor and the second electrical contactor being in an open state; and
a controller configured to:
provide a first switching command to the plurality of switching devices to switch from the primary position to the tapped position based on a transition signal, wherein the transition signal is based on comparing an electrical characteristic with a threshold value, wherein the electrical characteristic is generated based on using one or more input currents to the plurality of switching devices and using control circuitry.

17. The system of claim 16, further comprising:
a control system, wherein the control system comprises:
the plurality of switching devices; and
the controller.

18. The system of claim 16, wherein the plurality of permanent coils comprise a second set of permanent coils for a second phase of the synchronous three-phase electric motor and a third set of permanent coils for a third phase of the synchronous three-phase electric motor,
wherein the plurality of bypass coils comprise a second set of bypass coils for the second phase and a third set of bypass coils for the third phase, and
wherein the plurality of switching devices comprise a second set of switching devices for the second phase and a third set of switching devices for the third phase.

19. A method, comprising:
comparing a threshold value with an electrical characteristic associated with one or more input currents to a plurality of switching devices associated with a synchronous three-phase electric motor, wherein the electrical characteristic is generated based on using one or more input currents to the plurality of switching devices and using control circuitry, wherein the synchronous three-phase electric motor comprises a rotor, a stator, a plurality of coils formed from conductive windings each wound around one or more of a plurality of stator teeth of the stator, and a plurality of reactor or resistor devices, wherein the plurality of coils comprises a plurality of permanent coils and a plurality of bypass coils, wherein the plurality of switching devices are configured to selectively switch between a tapped position and a primary position, wherein the primary position electrically communicates power to only the plurality of permanent coils, and wherein the tapped position communicates power to both the plurality of permanent coils and the plurality of bypass coils, the plurality of permanent coils comprising a first set of permanent coils for a first phase of the synchronous three-phase electric motor, the plurality of bypass coils comprising a first set of bypass coils for the first phase, the plurality of switching devices comprising a first set of switching devices for the first phase, wherein the first set of permanent coils, the first set of bypass coils, and the first set of switching devices are in series with each other, the first set of switching devices comprising a first electrical contactor and a second electrical contactor, wherein a reactor or resistor device, of the plurality of reactor or resistor devices, is in parallel with the first electrical contactor of the first set of switching devices, and wherein the reactor or resistor device is configured to communicate power to the first set of permanent coils and the first set of bypass coils based on the first electrical contactor and the second electrical contactor being in an open state;
determining a transition signal based on the comparison; and
providing a first switching command to the plurality of switching devices to switch from the primary position to the tapped position based on the transition signal.

* * * * *